(12) United States Patent
Gao et al.

(10) Patent No.: US 12,149,483 B2
(45) Date of Patent: Nov. 19, 2024

(54) RESOURCE MANAGEMENT FOR REPORTING SIGNAL-TO-INTERFERENCE-PLUS-NOISE RATIO

(71) Applicant: ZTE Corporation, Guangdong (CN)

(72) Inventors: Bo Gao, Guangdong (CN); Zhaohua Lu, Guangdong (CN); Yu Ngok Li, Guangdong (CN); Hao Wu, Guangdong (CN); Chuangxin Jiang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 310 days.

(21) Appl. No.: 17/574,972

(22) Filed: Jan. 13, 2022

(65) Prior Publication Data
US 2022/0140960 A1    May 5, 2022

Related U.S. Application Data

(63) Continuation of application No. PCT/CN2019/096130, filed on Jul. 16, 2019.

(51) Int. Cl.
*H04L 5/00* (2006.01)
*H04W 24/10* (2009.01)
(52) U.S. Cl.
CPC .......... *H04L 5/006* (2013.01); *H04L 5/0048* (2013.01); *H04W 24/10* (2013.01)
(58) Field of Classification Search
CPC ..... H04L 5/006; H04L 5/0048; H04L 5/0023; H04W 24/10
See application file for complete search history.

(56) References Cited

U.S. PATENT DOCUMENTS

| | | | |
|---|---|---|---|
| 2019/0149290 A1* | 5/2019 | Liu | H04L 5/0094 370/329 |
| 2020/0267584 A1 | 8/2020 | Kim et al. | |
| 2022/0312433 A1* | 9/2022 | Guo | H04B 7/0632 |

FOREIGN PATENT DOCUMENTS

| | | | |
|---|---|---|---|
| WO | 2019/066619 A1 | 4/2019 | |
| WO | WO-2019099857 A1 * | 5/2019 | H04B 17/309 |
| WO | WO-2020187392 A1 * | 9/2020 | |

OTHER PUBLICATIONS

Vivo, Further discussion on Multi-Beam Operation, May 13-17, 2019, 3GPP TSG RAN WG1 #97 (Year: 2019).*
(Continued)

*Primary Examiner* — Charles C Jiang
*Assistant Examiner* — Rachel Elizabeth Marks
(74) *Attorney, Agent, or Firm* — Perkins Coie LLP

(57) ABSTRACT

Methods, systems, and devices for resource management for reporting signal-to-interference-plus-noise-ratio (SINR) in mobile communication technology are described. An example method for wireless communication includes transmitting, by a network node to a wireless device, a first resource configuration and a second resource configuration, where the first resource configuration comprises one or more first resources related to channel measurement, the second resource configuration comprises one or more second resources related to interference measurement, and at least one first resource is associated with at least one second resource; and receiving, by the network node, a report comprising one or more SINR values, where at least one SINR value is based on the at least one first resource and the at least one second resource.

19 Claims, 13 Drawing Sheets

(56) References Cited

OTHER PUBLICATIONS

International Search Report and Written Opinion mailed on Apr. 7, 2020 for International Application No. PCT/CN2019/096130, filed on Jul. 16, 2019 (8 pages).
ZTE, "Enhancements on multi-beam operation," TSG RAN WG1 Meeting #97, R1-1906237, Reno, USA, 18 pages, May 13-17, 2019.
ZTE, "Enhancements on multi-beam operation," TSG RAN WG1 Meeting #98bis, R1-1910285, Chongqing, China, 24 pages, Oct. 14-20, 2019.
Canadian office action issued in CA Patent Application No. 3,147,469, dated May 3, 2023, 4 pages.
European Search Report issued in corresponding EP Patent Application No. 19937912.4, dated Mar. 14, 2023, 8 pages.
Vivo, "Further discussion on Multi-Beam Operation," 3GPP TSG RAN WG1 #97, R1-1906160, Reno, USA, May 13-17, 2019, 9 pages.
Canadian notice of allowance issued in CA Patent Application No. 3,147,469, dated Feb. 15, 2024, 1 page.
Korean office action issued in KR Patent Application No. 10-2022-7005114, dated Aug. 20, 2024, 10 pages. English translation included.
Sony, "Enhancements on multi-beam operation," 3GPP TSG RAN WG1 #97, R1-1906851, Reno, USA, May 13-17, 2019, 9 pages.
Ericsson, "Enhancements to multi-beam operation," 3GPP TSG-RAN WG1 Meeting #96bis, Tdoc R1-1905156, Xi'an, China, Apr. 8-12, 2019, 16 pages.

\* cited by examiner

1150

1152 — Receiving, by a wireless device from a network node, a first resource configuration and a second resource configuration, the first resource configuration comprising one or more first resources related to channel measurement, the second resource configuration comprising one or more second resources related to interference measurement, and at least one first resource being associated with at least one second resource 1154 — Transmitting, by the network device to the network node, a report comprising one or more signal-to-interference-plus-noise ratio (SINR) values, at least one SINR value being based on measurement results of the at least one first resource and the at least one second resource

FIG. 11B

RESOURCE MANAGEMENT FOR REPORTING SIGNAL-TO-INTERFERENCE-PLUS-NOISE RATIO

CROSS-REFERENCE TO RELATED APPLICATIONS

This application is a continuation of International Patent Application No. PCT/CN2019/096130, filed on Jul. 16, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for resource management for reporting signal-to-interference-plus-noise-ratio (SINR) in mobile communication technology, including 5th Generation (5G) and New Radio (NR) communication systems.

In one exemplary aspect, a wireless communication method is disclosed. The method includes transmitting, by a network node to a wireless device, a first resource configuration and a second resource configuration, where the first resource configuration comprises one or more first resources related to channel measurement, the second resource configuration comprises one or more second resources related to interference measurement, and at least one first resource is associated with at least one second resource; and receiving, by the network node, a report comprising one or more SINR values, where at least one SINR value is based on the at least one first resource and the at least one second resource.

In some embodiments, the method may preferably further include transmitting, by the network node to the wireless device, a third resource configuration comprising one or more third resources related to interference measurement, where the at least one first resource or the at least one second resource is associated with at least one third resource, and the at least one SINR value is further based on a measurement result of the at least one third resource.

In another exemplary aspect, a wireless communication method is disclosed. The method includes receiving, by a wireless device from a network node, a first resource configuration and a second resource configuration, where the first resource configuration comprises one or more first resources related to channel measurement, the second resource configuration comprises one or more second resources related to interference measurement, and at least one first resource is associated with at least one second resource; and transmitting, by the network device to the network node, a report comprising one or more SINR values, where at least one SINR value is based on measurement results of the at least one first resource and the at least one second resource.

In some embodiments, the method may preferably include receiving, by the wireless device from the network node, a third resource configuration comprising one or more third resources related to interference measurement, where the at least one first resource or the at least one second resource is associated with at least one third resource, and the at least one SINR value is further based on a measurement result of the at least one third resource.

In some embodiments, the one or more second resources may be further related to noise measurement.

In some embodiments, the method may preferably include that one of the one or more second resources comprising one zero-power second resource or one non-zero-power second resource.

In some embodiments, the method may preferably include a feature that one of the one or more third resources comprising one zero-power third resource or one non-zero-power third resource.

In some embodiments, another feature of the method may preferably be that the one or more first resources comprising multiple first resources, where each of the multiple first resources is associated with one of the one or more second resources, and the multiple first resources exhibit at least one of the following properties: the multiple first resources have the same channel property assumption (CPA), or a repetition radio resource control (RRC) parameter for the multiple first resources is configured with an "off" value, or each of the multiple first resources is associated with a different downlink spatial domain filter, or the multiple first resources are precluded from being associated with the same downlink spatial domain filter.

In some embodiments, another feature of the method may preferably be that each of the one or more first resources being associated with a different downlink spatial domain filter upon a determination that more than one of the one or more first resources are associated with one of the one or more second resources.

In some embodiments, another feature of the method may preferably be that each of the one or more first resources being precluded from being associated with the same downlink spatial domain filter upon a determination that more than one of the one or more first resources are associated with one of the one or more second resources.

In some embodiments, another feature of the method may preferably be that the one or more third resources exhibiting at least one of the following properties: the one or more third resources have the same CPA, or the repetition RRC parameter for the one or more third resources is configured with an "off" value, or each of the one or more third resources is associated with a different downlink spatial domain filter, or the one or more third resources are precluded from being associated with the same downlink spatial domain filter.

In some embodiments, the method may preferably include a feature that an SINR value being based on a most recent second resource and a most recent first resource.

Another preferable feature of some embodiments includes the one or more first resources and the one or more second resources having the same channel property assumption (CPA).

Another preferable feature of some embodiments includes upon a determination that the second resource configuration comprises a single second resource, the method further comprising: configuring each of the one or more third resources to have the same channel property assumption (CPA), or configuring a repetition radio resource control (RRC) parameter for each of the one or more third resources with an "off" value, or associating each of the one or more third resources with a different downlink spatial domain filter, or disassociating the one or more third resources with the same downlink spatial domain filter.

Another preferable feature of some embodiments includes upon a determination that the second resource configuration comprises a single second resource, the method further comprising: configuring each of the one or more first resources to have the same channel property assumption (CPA), or configuring a repetition radio resource control (RRC) parameter for each of the one or more first resources with an "off" value, or associating each of the one or more first resources with a different downlink spatial domain filter, or disassociating the one or more first resources with the same downlink spatial domain filter.

Another preferable feature of some embodiments includes one of the one or more second resources comprising an aperiodic non-zero-power (NZP) second resource, and where a channel property assumption (CPA) of the aperiodic NZP second resource is provided by an aperiodic channel state information (CSI) triggering state.

Another preferable feature of some embodiments includes one of the one or more second resources comprising a semi-persistent non-zero-power (NZP) second resource, and where a channel property assumption (CPA) of the semi-persistent NZP second resource is provided by a medium access control (MAC) control element (CE) command.

Another preferable feature of some embodiments includes transmitting, by the network node to the wireless device, one of the one or more first resources in a first time unit; and transmitting, by the network node to the wireless device, one of the one or more second resources in a second time unit different from the first time unit upon a determination that at least one of the following conditions is met: a repetition radio resource control (RRC) parameter for the one or more first resources is configured with an "on" value, or the one or more first resources are associated with the same downlink spatial domain filter, or the repetition RRC parameter for the one or more second resources is configured with an "on" value, or the one or more second resources are associated with the same downlink spatial domain filter.

Another preferable feature of some embodiments includes receiving, by the wireless device from the network node, one of the one or more first resources in a first time unit; and receiving, by the wireless device from the network node, one of the one or more second resources in a second time unit different from the first time unit upon a determination that at least one of the following conditions is met: a repetition radio resource control (RRC) parameter for the one or more first resources is configured with an "on" value, or the one or more first resources are associated with the same downlink spatial domain filter, or the repetition RRC parameter for the one or more second resources is configured with an "on" value, or the one or more second resources are associated with the same downlink spatial domain filter.

Another preferable feature of some embodiments includes the one of the one or more first resources not being associated with the one of the one or more second resources.

Another preferable feature of some embodiments includes upon a determination that a repetition radio resource control (RRC) parameter for the one or more first resources or the one or more second resources is configured with an "on" value, the method further comprising: refraining from including an index of the one or more first resources in the report, or including only the SINR value in the report, or refraining from including both the SINR value and the index of the one or more first resources in the report.

Another preferable feature of some embodiments includes the one or more first resources comprising a set of N first resources, where the one or more second resources comprise a set of M second resources, M=N×K, and M, N and K are positive integers.

Another some embodiments feature of some embodiments of this method includes one of the N first resources being associated with an ordered set of K second resources.

Another preferable feature of some embodiments of this method includes the one or more first resources comprise a set of N first resources, where the one or more second resources comprise a set of M second resources, N=M×K, and M, N and K are positive integers.

Another preferable feature of some embodiments of this method includes an ordered set of K first resources being associated with one of the M second resources.

Another preferable feature of some embodiments of this method includes the one or more second resources being grouped into a one or more subsets of second resources, where one subset of the one or more subsets of second resources is associated with one of the one or more first resources.

Another preferable feature of some embodiments of this method includes the one or more first resources being grouped into a one or more subsets of first resources, and where one subset of the one or more subsets of first resources is associated with one of the one or more second resources.

Another preferable feature of some embodiments of this method includes determining an association between the at least one first resource and the at least one second resource is based on the same channel property assumption (CPA) configuration between the at least one first resources and the at least one second resource.

Another preferable feature of some embodiments of this method includes the one or more second resources with the same CPA comprising an ordered set of K second resources, where an index of the ordered set corresponds to an index of one of the one or more first resources with the same CPA, the at least one second resource comprises the ordered set, and the at least one first resource comprises the one of the one or more first resources.

Another preferable feature of some embodiments of this method includes the one or more first resources with the same CPA comprising an ordered set of K first resources, where an index of the ordered set corresponds to an index of one of the one or more second resources with the same CPA, the at least one first resource comprises the ordered set, and the at least one second resource comprises the one of the one or more second resources.

Another preferable feature of some embodiments of this method includes an association between the one or more first resources and the one or more second resources being based on an index of one first resource of the one or more first resources, and where the report comprises the index of the one first resource.

Another preferable feature of some embodiments of this method includes communicating a signal, where a channel property assumption (CPA) of the signal is determined according to the at least one first resource when at least one of the following conditions is met: the at least one first resource is transmitted a first amount of time before communicating the signal, or the at least one second resource associated with the at least one first resource is transmitted a second amount of time before communicating the signal, or each resource in one or more resource sets including the at least one first resource is transmitted a third amount of time before communicating the signal, or (d) at least one resource in the one or more resource sets that includes the at least one first resource is transmitted a fourth amount of time before communicating the signal.

Another preferable feature of some embodiments of this method includes the at least one of the first amount of time, the second amount of time, the third amount of time and the fourth amount of time is based on one or more capabilities of the wireless device.

Another preferable feature of some embodiments of this method includes the first amount of time is equal to the second amount of time.

Another preferable feature of some embodiments of this method includes the signal is an uplink data channel signal, an uplink control channel signal or an uplink reference signal, and where at least one of the first amount of time, the second amount of time, the third amount of time and the fourth amount of time is zero.

Another preferable feature of some embodiments of this method includes multiple resource sets including the same first resource or the same second resource, and where repetition radio resource control (RRC) parameters of the multiple resource sets are configured with the same value.

Another preferable feature of some embodiments of this method includes a repetition radio resource control (RRC) parameter of the one or more first resources being precluded from being configured with an "on" value.

Another preferable feature of some embodiments of this method includes a repetition radio resource control (RRC) parameter of the one or more second resources being precluded from being configured with an "on" value.

Another preferable feature of some embodiments of this method includes a repetition radio resource control (RRC) parameter of the one or more second resources being the same value as the repetition RRC parameter of the one or more first resources.

Another preferable feature of some embodiments of this method includes multiple reporting configurations being associated with at least one same first resource of the one or more first resources.

Another preferable feature of some embodiments of this method includes a SINR reporting configuration or measurement and an RSRP reporting configuration or measurement being associated with at least one same first resource, and where the method further comprises: ignoring the SINR reporting configuration or measurement, or prioritizing the RSRP reporting configuration or measurement over the SINR reporting configuration or measurement, or determining a priority of the reporting configuration or measurement according to an index of the reporting configuration.

Another preferable feature of some embodiments of this method includes a SINR reporting configuration or measurement and an RSRP reporting configuration or measurement being associated with at least one same first resource, and where the method further comprises: ignoring the RSRP reporting configuration or measurement, or prioritizing the SINR reporting configuration or measurement over the RSRP reporting configuration.

Another preferable feature of some embodiments of this method includes one of the one or more first resources being precluded from being associated with all of a SINR reporting configuration and a reference signal received power (RSRP) reporting configuration.

Another preferable feature of some embodiments of this method includes the one or more first resources being further related to an interference and noise measurement.

Another preferable feature of some embodiments of this method includes one of the one or more second resources comprising one non-zero-power (NZP) second resource, and where the at least one SINR value is based on a signal power contribution of the NZP second resource or a receive power contribution of the NZP second resource.

Another preferable feature of some embodiments of this method includes one of the one or more third resources comprising one non-zero-power (NZP) third resource, and where the at least one SINR value is based on a signal power contribution of the NZP third resource or a receive power contribution of the NZP third resource.

Another preferable feature of some embodiments of this method includes the at least one SINR value being a linear average of a power contribution of the at least one first resource divided by a sum of at least one of the following: a linear average of a noise and interference power contribution of the at least one first resource; a linear average of a noise and interference power contribution of the at least one second resource; a linear average of a receive power contribution of the at least one second resource; a linear average of a signal power contribution of the at least one second resource.

Another preferable feature of some embodiments of this method includes the at least one SINR value being a linear average of a power contribution of the at least one first resource divided by a sum of at least one of the following: a linear average of a noise and interference power contribution of the at least one first resource; a linear average of a noise and interference power contribution of the at least one second resource; a linear average of a receive power contribution of the at least one second resource; a linear average of a signal power contribution of the at least one third resource; a linear average of a receive power contribution of the at least one third resource.

Another preferable feature of some embodiments of this method includes one of the one or more second resource comprising one zero-power (ZP) second resource, where the at least one SINR value is based on a receive power contribution of the one ZP second resource.

Another preferable feature of some embodiments of this method includes the report comprising a plurality of SINR values, and where one or more of the plurality of SINR values are relative to a reference SINR value.

Another preferable feature of some embodiments of this method includes the reference SINR value being a largest SINR value of the plurality of SINR values.

Another preferable feature of some embodiments of this method includes the reference SINR value being a measured SINR value.

Another preferable feature of some embodiments of this method includes one or more of the plurality of SINR values corresponding to an antenna group or a beam group.

Another preferable feature of some embodiments of this method includes the plurality of SINR values being included in a first group, and where the reference SINR value for the first group is included in a second group.

Another preferable feature of some embodiments of this method includes reported codes of the one or more of the plurality of SINR values being determined based on a first SINR mapping between a SINR value and a codepoint in an SINR reporting field.

Another preferable feature of some embodiments of this method includes a step size for the first SINR mapping being configurable or determined based on the reference SINR value.

Another preferable feature of some embodiments of this method includes the step size being determined based on a range, where the reference SINR is within the range.

Another preferable feature of some embodiments of this method includes the reported codes of one or more of the plurality of SINR values being further determined based on a second SINR mapping comprising a comparison of the reference SINR value or a comparison of an absolute SINR value.

Another preferable feature of some embodiments of this method includes the at least one first resource comprising one first resource, where the at least one second resources comprises up to L1 second resources, and L1 is an integer that is determined based on capabilities of the wireless device.

Another preferable feature of some embodiments of this method includes the at least one first resource comprising up to L2 first resources, where the at least one second resources comprises one second resource, and L2 is an integer that is determined based on capabilities of the wireless device.

Another preferable feature of some embodiments of this method includes one of the one or more one second resources comprising one zero-power (ZP) second resource, where one of the one or more third resources comprises one non-zero-power (NZP) third resource, and at least one of the following parameters is determined based on capabilities of the wireless device: a maximum number of the one or more second resources, where a repetition RRC parameter for the one or more second resources is configured with an "on" value; or a maximum number of the one or more third resources; or a maximum total number of the one or more second resources and the one or more third resources.

Another preferable feature of some embodiments of this method includes one of the one or more second resources comprising one non-zero-power (NZP) second resource, and where at least one of the following parameters is determined based on capabilities of the wireless device: support for the repetition RRC parameter to be configured for the one or more second resources; or support for the repetition RRC parameter for the one or more second resources to be configured with an "on" value; or a maximum number of the one or more second resources, where the repetition RRC parameter for the one or more second resources is configured with an "on" value; or support for the repetition RRC parameter for the one or more second resources to be configured with an "off" value; or a maximum number of the one or more second resources, and the repetition RRC parameter for the one or more second resources is configured with an "off" value.

Another preferable feature of some embodiments of this method includes a reporting time per subcarrier spacing being determined based on capabilities of the wireless device.

Another preferable feature of some embodiments of this method includes an SINR reporting time capability parameter of the wireless device being determined according to an RSRP reporting time capability parameter.

Another preferable feature of some embodiments of this method includes at least the first resource comprising one or more of a synchronization signal block (SSB), a channel state information (CSI)-reference signal (RS) resource, a non-zero-power CSI-RS (NZP-CSI-RS) resource or a NZP-CSI-RS resource for channel measurement.

Another preferable feature of some embodiments of this method includes at least the second resource comprising a non-zero-power (NZP) second resource that is equivalent to a NZP channel state information (CSI)-reference signal (RS) resource for interference measurement, or a zero-power (ZP) second resource that is equivalent to a CSI interference measurement (CSI-IM) resource.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 11A and 11B show examples of wireless communication methods, in accordance with some embodiments of the presently disclosed technology.

DETAILED DESCRIPTION

As the use of wide and ultra-wide spectrum resources increase, the considerable propagation loss induced by the extremely high frequency becomes a noticeable challenge. To mitigate this issue, antenna array and beam-forming training technologies using massive MIMO, e.g., up to 1024 antenna elements for one node, have been adopted to achieve beam alignment and obtain sufficiently high antenna gain. To ensure a low implementation cost while still benefiting from the advantages provided by an antenna array, analog phase shifters have become very attractive for implementing mmWave beam-forming, where the number of phases is finite and constant modulus constraints are placed on the antenna elements. Given the pre-specified beam patterns, variable-phase-shift-based beamforming training attempts to identify the best pattern for subsequent data transmission, e.g., in the one transmission point (TRP) and one-panel cases.

Figure 1:
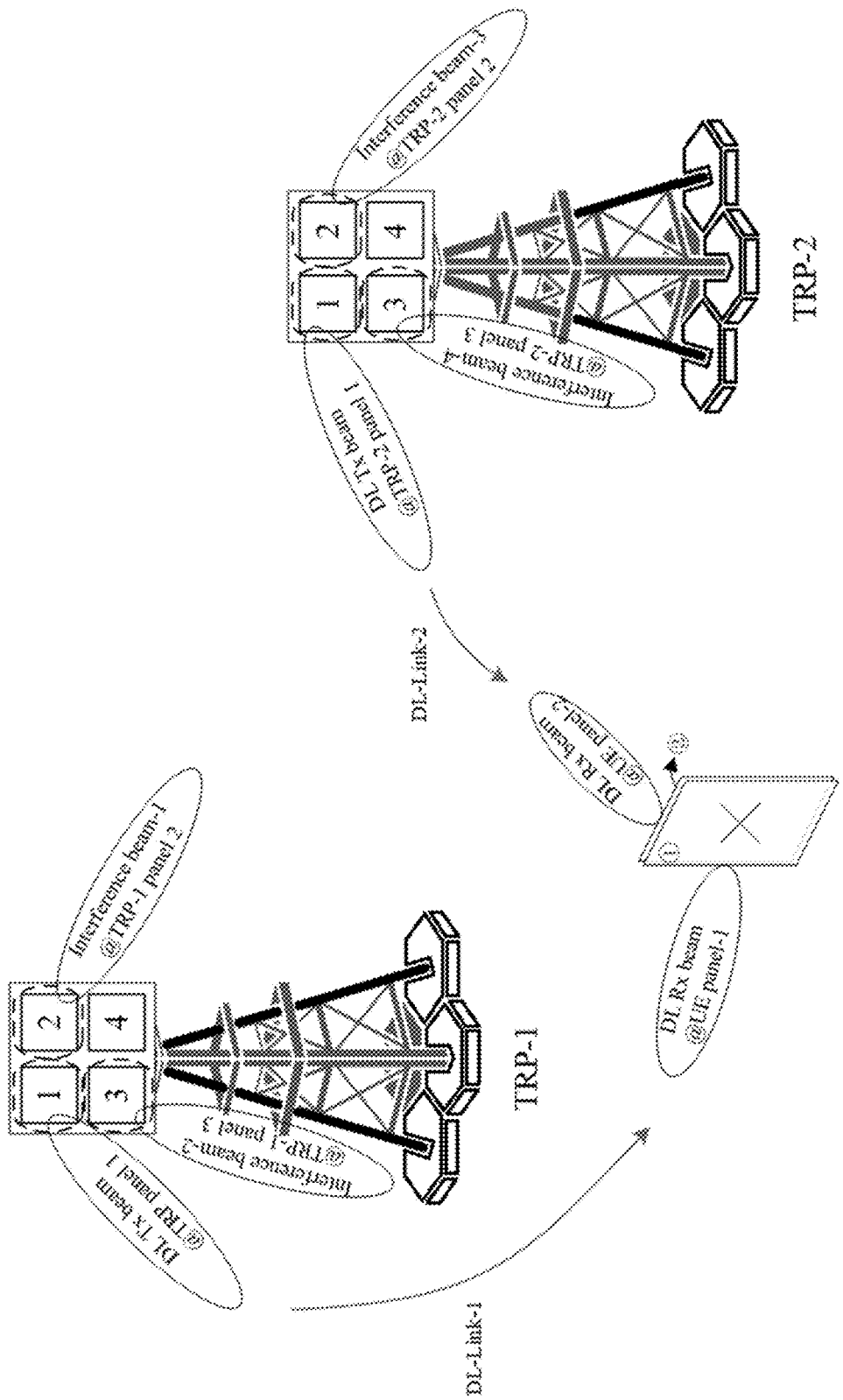
FIG. 1 shows an example of SINR based beam measurement and reporting across a multi-TRP (transmission point) where the UE side has two panels.

Multi-TRP and multi-panel cases should be considered for beyond 5G gNB (base station) and the next-generation communications, where there are multiple panels for UE in order to cover whole space for enhancing coverage. In an example, one panel for a TRP and UE may have two TXRUs, which are associated with cross polarization. Thus, in order to achieve a high rank or multi-layer transmissions, the TRP and UE should try to use different beams generated from different panels with objective of sufficiently using capability of each panel, including its associated TXRUs. FIG. 1 shows an example of SINR based beam measurement and reporting across a multi-TRP (transmission point) where the UE side has two panels.

Furthermore, in 5G NR, analog beam-forming was primarily introduced into mobile communication for guaranteeing the robustness of high frequency communications. Reference signal (RS) received power (RSRP) has been agreed as one metric for beam reporting in 5G NR. Generally, a UE will report N Tx beams (e.g., downlink (DL) reference signal (RS) index) with objective of maximizing RSRP as well as its corresponding RSRP results through measuring channel measurement resource (CMR, which can include a channel state information-reference signal (CSI-RS) resource for channel measurement and/or a synchronization signal block), and subsequently a gNB will select one beam from candidate set according to beam reporting and its scheduling schemes.

However, the RSRP value can only represent the receive power corresponding to the DL RS without considering impacts of interference and noise powers, and consequently cannot predict transmission performance accurately (e.g., block error-rate (BLER)). For instance, different interference can be observed for different beam link and, as a result, one beam link with larger RSRP may have worst BLER performance than that with smaller RSRP, due to experiencing a greater amount of interference.

Consequently, SINR should be included into beam reporting as a new metric in addition to RSRP. Similarly, the interference measurement can be made using a non-zero power interference measurement resource (NZP-IMR) or a zero power interference measurement resource (ZP-IMR). For SINR determination, the following technical problems should be solved for beam reporting and indication.

(1) CMR and IMR (e.g., NZP-IMR and ZP-IMR) are associated for an SINR result in a reporting instance when simultaneous receiving is supported. For instance, when multiple CMRs and multiple IMRs are configured for SINR measurement, the SINR results to be reported should be based on the CMR and its associated IMR only (which are selected from the pool of CSI-RS and IMR combination), rather than combination between CMR and any of IMR(s), e.g., up to UE implementation, taking into account the measurement and reporting overhead.

(2) Beam indication based on SINR measurement results should be considered. For instance, given the same DL RS as a reference for beam indication Rx beam, UE behavior for Rx beam determination with SINR (e.g., considering interference beam/associated IMR) and that for RX beam determination with RSRP (e.g., without considering interference beam) can be different with high probability. Therefore, from a UE perspective, the signaling for beam indication should also provide the interference beam information, or the effective time for SINR/RSRP measurement should be specified for beam indication.

(3) Collision or measurement rules for a CMR resource to be used for both SINR and RSRP based measurement should be specified. For instance, when one CMR resource can be configured for or associated with both SINR and RSRP measurement, the UE assumption for Tx/Rx beam sweeping may not be same.

(4) The reporting format for different SINR reporting should be taken into account, in order to reduce the reporting overhead. For example, the following parameters must be accounted for: reference or absolute SINR determination (one or more reference SINR, e.g., per beam group or antenna group), special state to represent the range of different SINR to be reported and flexible step for different SINR.

Figure 2:
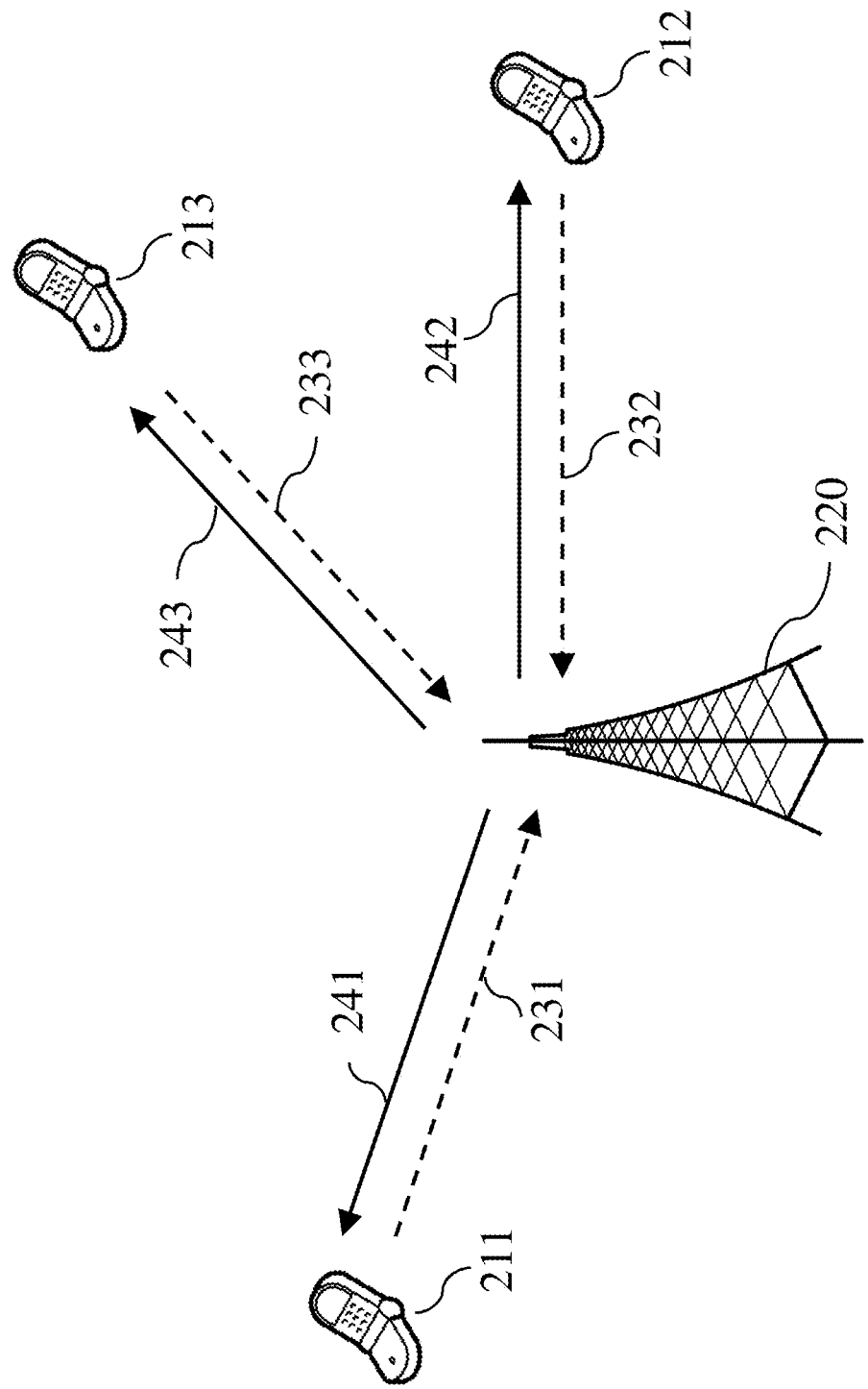
FIG. 2 shows an example of a base station (BS) and user equipment (UE) in wireless communication, in accordance with some embodiments of the presently disclosed technology.

FIG. 2 shows an example of a wireless communication system (e.g., an LTE, 5G or New Radio (NR) cellular network) that includes a BS 220 and one or more user equipment (UE) 211, 212 and 213. In some embodiments, the downlink transmissions (241, 242, 243) include resource configurations that include one or more resources, some of which are associated with each other. In response, the UEs perform channel and interference measurements, and transmit (231, 232, 233) SINR values in a report to the BS 220. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Nomenclature for Embodiments of the Disclosed Technology

In existing implementations (e.g., the current 5G standard), the SINR is defined as the linear average over the power contribution (in a bandwidth W) of the resource elements carrying DL RS divided by the linear average of the noise the interference power contribution over the corresponding DL RS within the same frequency bandwidth. In an example, this definition may be applicable for L3 measurements rather than beam reporting.

In some embodiments, the interference includes intra-cell interference and inter-cell interference. In an example, the gNB can estimate or prevent from intra-cell interference through scheduling low-correlated DL Tx beams serving independent UE(s), but, due to the non-ideal backhaul, it is hard to co-schedule Tx beam(s) flexibly for UE from different gNB or cell for eliminating inter-cell interference. In another example, NZP-IMR can be used for estimating intra-cell interference as usual through emulating potential interference beam or source from the same cell, and the ZP-IMR can be used for estimating inter-cell interference.

Furthermore, in the drawings, the descriptions, and the claims of this document the following terminology is adopted. In some embodiments, a "beam" may be interpreted as reference signaling, spatial filters or precoding.

In some embodiments, a "Tx beam" is equivalent to DL/UL reference signalling (such as channel state information reference signaling (CSI-RS), synchronization signaling block (SSB) (which is also called as SS/PBCH), demodulation reference signalling (DMRS), sounding reference signalling (SRS)), Tx spatial filter or Tx precoding.

In some embodiments, an "Rx beam" is equivalent to spatial filter, Rx spatial filter or Rx precoding.

In some embodiments, a "beam ID" is equivalent to reference signalling index, spatial filter index or precoding index.

In some embodiments, a "channel property assumption (CPA)" is equivalent to quasi co-location (QCL), transmission configuration indication (TCI), spatial filter, antenna group or reference RS set. For example, "QCL" is comprised of one or more reference RSs and their corresponding QCL type parameters, where QCL type parameters include at least one of the following: [1] Doppler spread, [2] Doppler shift, [3] delay spread, [4] average delay, [5] average gain, and [6] spatial parameter, either individually or in combination. In an example, the spatial filter can be either a UE-side filter or a gNB-side filter.

In some embodiments, the term "signal A and signal B have the same CPA" is equivalent to "signal A is QCLed with signal B with respect to at least one type of QCL parameters: [1] Doppler spread, [2] Doppler shift, [3] delay spread, [4] average delay, [5] average gain, and [6] spatial parameter". Similarly, the term "different CPA" may be equivalent to the case that at least RSs associated with the spatial parameter of QCL of the DL RSs or channels are different, irrespective of other types of QCL parameters as mentioned above. In another example, the term "different CPA" may be equivalent to the case that any RSs associated with any type QCL parameters of the DL RSs or channels are different.

In some embodiments, a "beam group" is equivalent to different Tx beams within one group being simultaneously received or transmitted, and/or Tx beams between different groups not being simultaneously received or transmitted.

In some embodiments, an "antenna group" is equivalent to different Tx beams within one group not being simultaneously received or transmitted, and/or Tx beams between different groups being simultaneously received or transmitted.

In an example, an "antenna group" is equivalent to more than N different Tx beams within one group not being simultaneously received or transmitted, and/or no more than N different Tx beams within one group being simultaneously received or transmitted, where N is positive integer.

In an example, an "antenna group" is equivalent to Tx beams between different groups being simultaneously received or transmitted.

In some embodiments, the antenna group is equivalent to antenna port group, panel or UE panel.

In some embodiments, a CMR is equivalent to SSB, CSI-RS resource, NZP-CSI-RS resource or NZP-CSI-RS resource for channel measurement.

In some embodiments, an IMR at least comprises one of NZP IMR or ZP IMR. NZP-IMR is equivalent to NZP CSI-RS resource for interference measurement. ZP IMR is equivalent to channel-state-information interference measurement (CSI-IM) resource.

In some embodiments, an SINR reporting configuration is equivalent to a channel state information (CSI) reporting configuration with reporting quantity of SINR or none.

In some embodiments, a measurement result is equivalent to a power contribution.

In some embodiments, a signal power contribution of a resource is equivalent to a power contribution of a resource carrying the signal. In some embodiments, a receive power contribution (also referred to as a received power contribution) of a resource is equivalent to total power contribution of receiving a resource. The total power contribution of receiving a resource is related to all received power of signal, noise and interference.

In some embodiments, the absence of a repetition radio resource control (RRC) parameter is equivalent to the repetition RRC parameter configured to be 'off' or the case that the resources within the set corresponding to the repetition RRC parameter are precluded from being transmitted with the same spatial domain filter.

In some embodiments, a time unit is a sub-symbol, a symbol, a slot, a subframe, a frame, or a transmission occasion.

Exemplary embodiments for resource management for reporting SINR

Embodiment #1—SINR Reporting with IMR

In some embodiments, the radio resource control (RRC) parameter of SINR reporting configuration is configured by gNB, and the at least one of CMR resource setting, NZP-IMR resource setting and ZP-IMR resource setting is associated with the SINR reporting configuration. For each setting, one or more resource sets can be configured, and the one or more resources can be configured within the corresponding set.

In some embodiments, the CMR and NZP-IMR is used for beam management, and the repetition RRC parameter can be configured for CMR and NZP-IMR resource set.

In an example, when the repetition RRC parameter is configured with an 'on' value (or simply, configured to be 'on'), the resources within the set are transmitted with the same downlink (DL) spatial domain transmission filter.

In an example, when the repetition RRC parameter is configured to be 'off', the resources within the set are not transmitted with the same DL spatial domain transmission filter, i.e., different DL spatial domain transmission filter.

In an example, the absence of the repetition RRC parameter (e.g., "the field of the repetition RRC parameter is absent in RRC") is equivalent to the parameter being configured to be 'off' as a condition for not specifying the same DL spatial domain transmission filter for resources in the corresponding set. This advantageously ensures backward compatibility.

In some embodiments, the configuration of repetition RRC parameter or the CPA is precluded for ZP-IMR, due to the fact that there are no signals to be transmitted from the serving cell, and these two parameters are derived according to the corresponding CMR or NZP-IMR.

In an example, when multiple CMRs are associated with the same ZP-IMR, the multiple CMRs should have the same CPA, or the repetition RRC parameter of the CMRs is configured to be 'off'.

In an example, when multiple NZP-IMRs are associated with the same ZP-IMR, the multiple NZP-IMRs should have the same CPA, or the repetition RRC parameter of the NZP-IMRs is configured to be 'off'.

Figure 3:
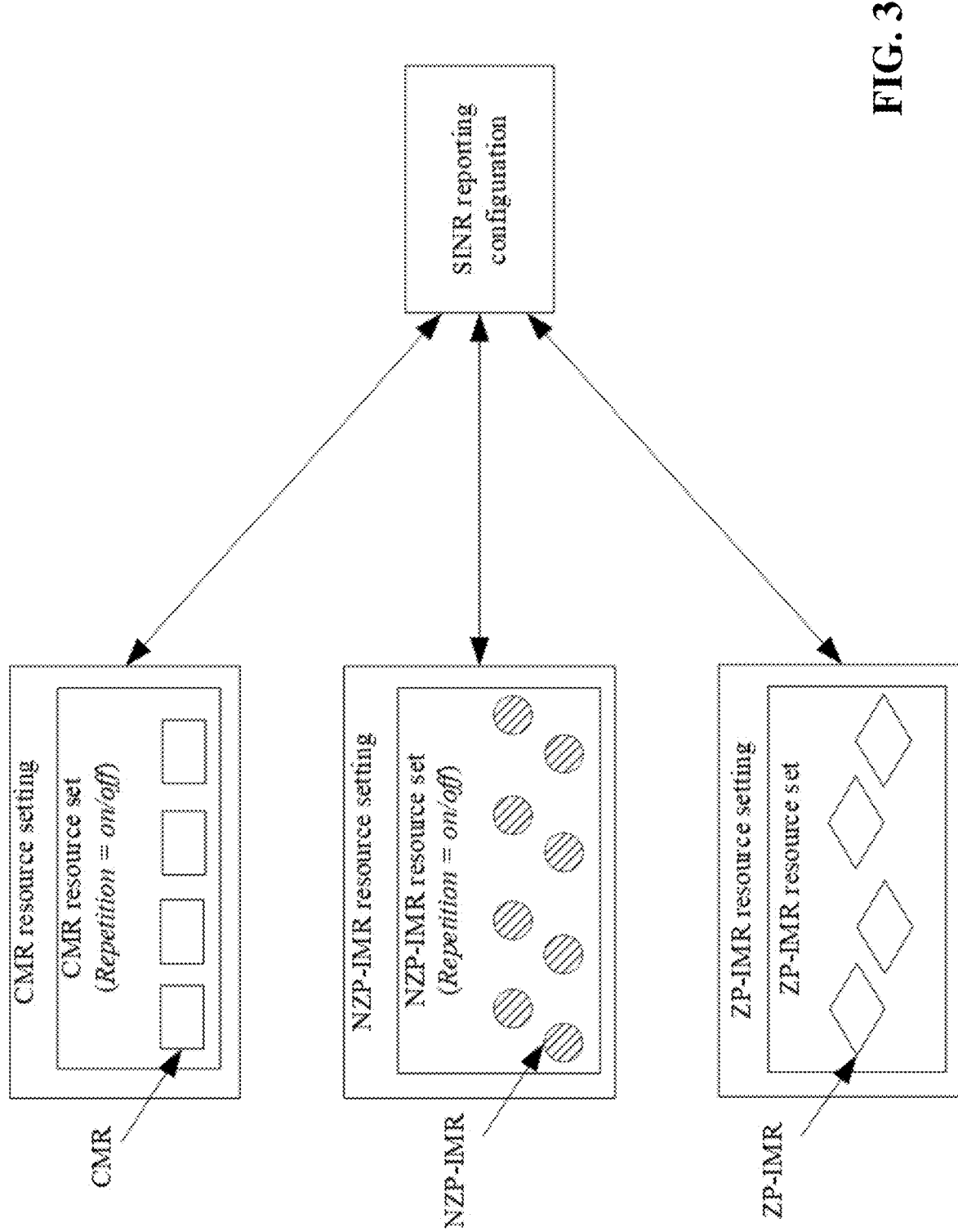
FIG. 3 shows an example of a configuration framework for SINR reporting.

An example of the configuration framework for SINR reporting is shown in FIG. 3.

In some embodiments, and in order to restrict the SINR measurement within a given measurement occasion, the RRC parameter for measurement restriction can be configurable for SINR reporting. For instance, the parameter for measurement restriction includes RRC parameter timeRestrictionForChannelMeasurements, or RRC parameter timeRestrictionForInterferenceMeasurements.

In an example, when the RRC parameter for measurement restriction is not configured, the UE derives the channel or interference measurement for computing SINR. For instance, the most recent and previous occasion of corresponding resource both can be used.

In an example, when the RRC parameter for measurement restriction is configured, the UE derives the channel or interference measurement for computing SINR based on only the more recent occasion of corresponding resource. Using only the most recent occasion is advantageous in dynamic interference environments (e.g., averaging over multiple occasions may result in erroneous results if some occasions do not have interference due to the interference varying and may not be present in some occasions).

In some embodiments, CMR and IMR (including NZP-IMR and ZP-IMR) are associated for a SINR results in a reporting instance, where, once the CMR and associated IMR is selected to be reported, the CMR and associated IMR is used together for SINR determination.

In some embodiments, the association between the CMR and IMR may be configured using one of the following methods:

Option 1. There is a set of N CMR(s) and a set of M IMR(s) resources which are configured in the SINR reporting configuration, where M=NK and N, K and M are positive integers. One resource of the CMR set and respective K resources of the IMR set in order are associated. In an example, N is less than or equal to M.

Option 2. There is a set of N CMR(s) and a set of M IMR(s) resources which are configured in the SINR reporting configuration, where N=MK and N, K and M are positive integers. K resources of the CMR set in order and respective 1 resource of the IMR set in order are associated. In an example, M is less than or equal to N.

Option 3. The association between CMR and IMR is configured per resource group. In an example, IMR(s) in the set are grouped into multiple subset(s) of IMR, and the subset of IMR can be associated with a CMR or a CMR group. In another example, CMR(s) in the set are grouped into multiple subset(s) of CMR, and the subset of CMR can be associated with a IMR or a IMR group.

Option 4. The association between CMR(s) and IMR(s) is determined according to the CPA configuration of CMR and IMR, e.g., spatial parameter, or QCL parameter.

In an example, the CMR and IMR are associated if the CMR and IMR have the same CPA. For example, the IMR can be NZP-IMR.

In an example, the one CMR of the CMR(s) and respective K IMR of the IMR(s) in order are associated. For example, the number of CMR(s) is less than or equal to that of IMR(s) which has the same CPA as the CMR(s).

In an example, the one IMR of the IMR(s) and respective K CMR of the CMR(s) in order are associated. For example, the number of IMR(s) is less than or equal to that of CMR(s) which have the same CPA as the IMR(s).

Option 5. The association between CMR(s) and IMR(s) is determined according to CMR whose index is to be reported in a SINR reporting instance.

In an example, the QCL of IMR is determined according to the CMR to be reported.

For example, there may be two Downlink Control Information (DCI) used for this case. The first DCI triggers a measurement with CMR only, and a best CMR index is to be reported; subsequently, the second DCI triggers a measurement with IMR only, and a IMR index is reported.

For example, the IMR resource set is associated with a CMR resource set index through CSI or SINR reporting configuration. Thus, the best CMR from the configured CMR resource set index is used to determine the CPA of resources in the IMR set.

In an example, for aperiodic CSI reporting, the scheduling offset of IMR should be larger than CMRs in the set, in order to guarantee that the Rx spatial domain filter of IMR is determined according to the CMR which is determined to be reported after the previous measurement.

In some embodiments, the CMR(s) and its associated IMR(s) shall have the same CPA, e.g., spatial parameter.

In some embodiments, the UE shall use the same Rx spatial domain filter(s) to receive the CMR and its associated IMR(s).

In some embodiments, the QCL spatial parameter or spatial domain filter of IMR, e.g., NZP-IMR, is obtained or overwritten according to the associated CMR.

In an example, the CPA parameter, e.g., {Doppler spread, Doppler shift, delay spread, average delay}, of aperiodic NZP-IMR is provided by aperiodic CSI triggering state.

In an example, the CPA parameter, e.g., {Doppler spread, Doppler shift, delay spread, average delay}, of semi-persistent NZP-IMR is provided by MAC-CE command.

In some embodiments, when CMR, NZP-IMR and ZP-IMR all are configured for the SINR measurement, only one ZP-IMR resource can be configured taking into account of overhead. In such case, all these resources of CMR and NZP-IMR should have the same CPA, and meanwhile the CPA of ZP-IMR can be derived from CMR accordingly.

In an example, the interference measurement results of ZP-IMR is only used for CMR with the same CPA, e.g., according to spatial parameter. That means that, in this case, the only one ZP-IMR is associated with all CMR.

In an example, the SINR reporting based on CMR+NZP-IMR+ZP-IMR is to report N CMRs and associated N SINR values, where the NZP-IMR associated with the CMR is to describe the low interference beam(s), and the ZP-IMR is to measure the inter-cell interference as background interference.

In some embodiments, and in the context of the repetition RRC parameter for CMR and IMR, the same repetition parameter value is configured or derived for sets of CMR and IMR in a SINR reporting configuration in order to guarantee unified UE behavior, e.g., same Rx beam and panel in UE sides.

In an example, when the repetition RRC parameter of CMR and IMR are configured to be 'off', the CMR(s)

in a set and IMR(s) in a set are transmitted with different spatial domain filter (or the CMR(s) in a set and IMR(s) in a set are precluded from being transmitted with same spatial domain filter). For example, the IMR(s) in a set should be associated with CMR(s) in a set.

In an example, when the RRC parameter repetition of CMR or IMR are configured to be 'on', the CMR(s) in a set and IMR(s) in a set are transmitted with same spatial domain filter. For example, the IMR(s) in a set should be associated with CMR(s) in a set.

In an example, when the repetition RRC parameter of CMR or IMR are configured to be 'on', the CMR(s) in a set and IMR(s) in a set are transmitted in different OFDM symbols. For example, the CMR(s) in a set and its non-associated NZP-IMR resources are transmitted in different OFDM symbol.

In an example, when the repetition RRC parameter of CMR or IMR are configured to be 'on', at least one of the following should be supported. For example, the index of CMR is precluded in the reporting instance. Or, only SINR is reported in the reporting instance. Alternatively, the reporting for CMR index+SINR is precluded.

In some embodiments, when CMR comprises SSB(s), the RRC parameter of repetition for IMR should be "off".

In some embodiments, the CMR(s) in a set and IMR(s) in a set are associated with the same antenna group ID(s), in a reporting configuration, e.g., CSI reporting configuration or SINR reporting configuration. For example, the IMR(s) in a set should be associated with CMR(s) in a set.

Embodiment #2—Beam Indication Based on SINR Measurement

In some embodiments, and in the context of SINR measurement and reporting, a data or control channel can be transmitted according to the indicated CPA with CMR index by gNB. Besides an SINR based measurement, one CMR also can be used for RSRP based measurement, which means that the corresponding Rx spatial domain filters may be different even for the same CMR due to different measurement metrics. Consequently, the timeline for CPA or spatial domain filter determination for DL or UL transmission may be specified.

Thus, the CPA or spatial domain filter for a signal, which can be DL control channel, DL data channel, DL RS, UL control channel, UL data channel, or UL RS, should be determined according to the latest CMR indicated by the CPA, where the CMR should satisfy at least one of the following conditions:

(1) The CMR is transmitted H1 time units before the signal.
(2) The IMR(s) associated with CMR is transmitted H2 time units before the signal, or at least one of the CMR or the IMR(s) associated with CMR is transmitted H2 time units before the signal.
  In an example, the IMR(s) and CMR are in the same reporting configuration, which is associated with the CMR.
  In an example, when the CMR is aperiodic RS, the IMR(s) is triggered by the same triggering state as the CMR.
(3) Resources in the resource set(s) associated with the CMR all are transmitted H3 time units before the signal, or at least one of resources in the resource set(s) associated with the CMR all are transmitted H3 time units before the signal.
  In an example, the resource set(s) can be IMR resource set(s) and CMR resource set(s) in the reporting configuration, which is associated with the CMR.
  In an example, when the CMR is aperiodic RS, the resource set(s) are triggered by the same triggering state as the CMR.

In some embodiments, H1, H2 and H3 are determined based on the UE capability, which can be determined according to beam reporting time, e.g., for RSRP or for SINR, accordingly.

In some embodiments, H1, H2 and H3 can be the same value.

In some embodiments, for UL control channel, UL data channel, or UL RS, the value of H1, H2 or H3 is zero. It is due to the fact that there are sufficient latency between DL and UL transmission switching.

In some embodiments, the spatial domain filter for the signal is determined according to the latest CMR indicated by CPA, which means that the same spatial domain filter used for the latest CMR reception is used for the signal reception.

Figure 4A:
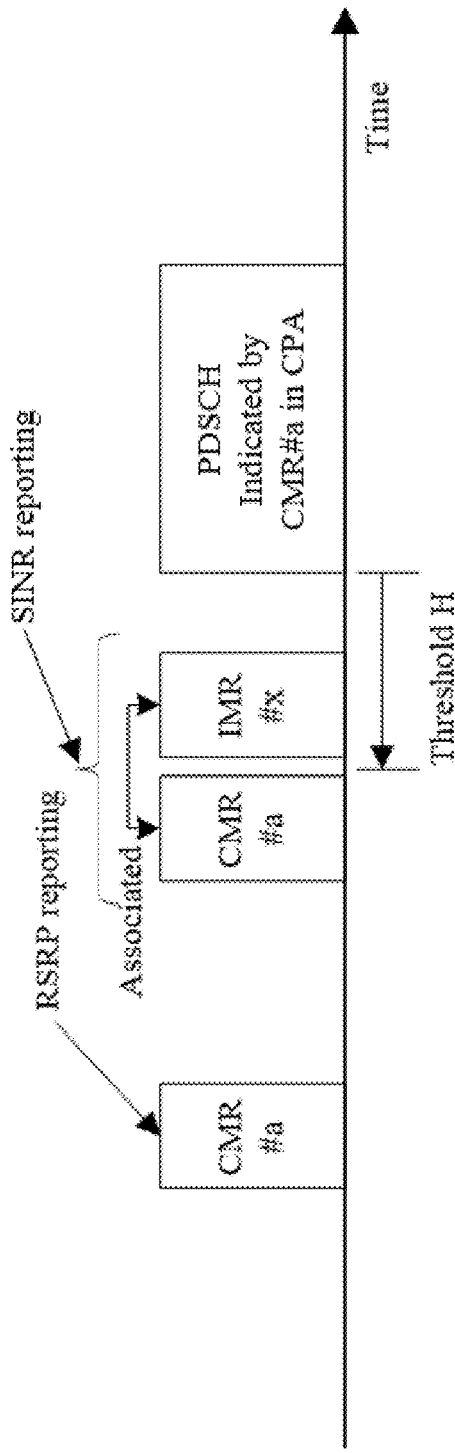
FIGS. 4A and 4B show timelines for beam indication based on SINR measurements.

For instance, an example of beam indication is shown in FIG. 4A. As shown therein, the PDSCH transmission is indicated by CPA with reference RS of CMR #a, but which has been transmitted two times. The first transmission is used for RSRP reporting, but the second one is used for SINR reporting with IMR for assist of interference measurement. According to the rules that the CMR and the IMR(s) associated with CMR, if any, shall be transmitted H time units before the signal, the former CMR (used for RSRP reporting), rather than the latter one used for SINR reporting, is used for spatial domain filter determination of the PDSCH transmission.

Figure 4B:
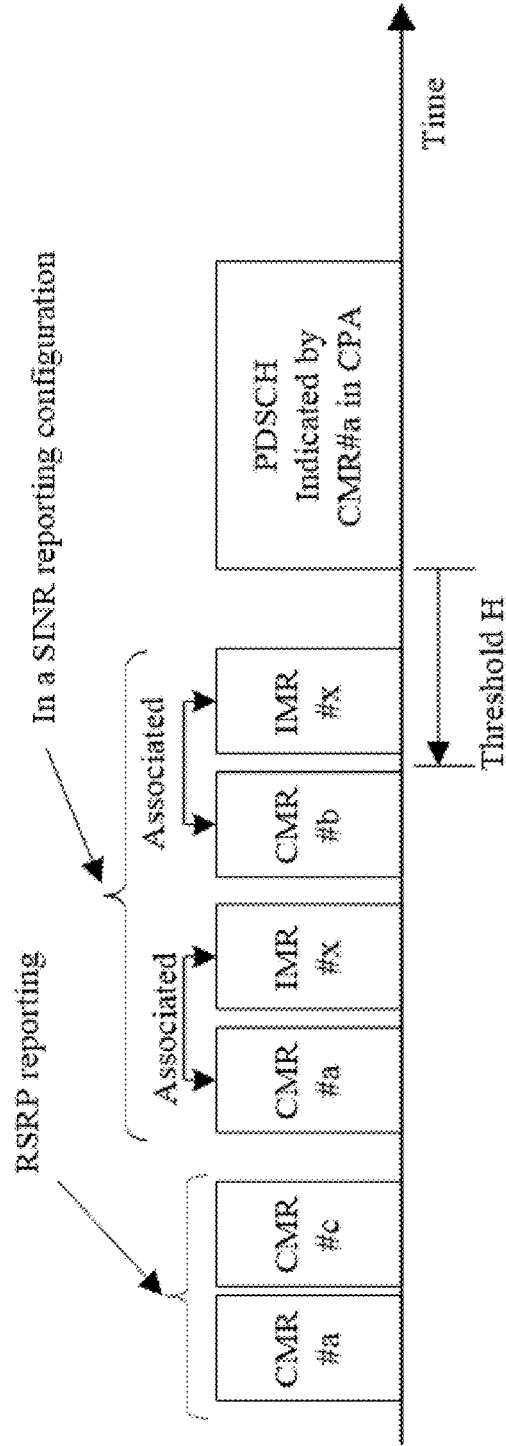

For instance, another example of beam indication is shown in FIG. 4B. As shown therein, the PDSCH transmission is indicated by CPA with reference RS of CMR #a. According to the rules that resources in the resource set(s) associated with the CMR all are transmitted H time units before the signal, the former CMR #a for RSRP reporting, rather than the latter one for SINR reporting, is used for determining CPA or spatial domain filter of the PDSCH transmission.

Embodiment #3—CMR and IMR for Multiple Types of Beam Measurements

In some embodiments, and from the UE perspective, a CMR resource can be configured for SINR and RSRP based reporting configuration for measurement, but UE behavior of DL Tx and Rx beam sweeping should be unified. For DL Tx beam sweeping of RRC parameter "repetition=off", the UE Rx beam should be kept unchanged, but, for DL Rx beam sweeping of RRC parameter "repetition=on", the UE Rx beams should be swept or changed.

In order to prevent uncertainty of UE behavior from gNB perspective, when CMR or IMR is configured with repetition RRC parameter, at least one of the following features should be supported:

(1) The repetition RRC parameter of the resource sets with the same CMR or IMR should be configured with the same value.
(2) When CMR or IMR is configured in a SINR reporting configuration, in the case that the repetition RRC parameter is 'on', the resource sets with the CMR or IMR should be precluded, or the repetition RRC parameter being 'off' should be associated with the resource sets with the CMR or IMR.

(3) When a CMR or IMR is associated with both SINR and RSRP reporting configuration, at least one of the following candidate is supported:

The case when the repetition RRC parameter is 'on' should be precluded, or the repetition RRC parameter is 'off', where the RRC parameter repetition is for the CMR or IMR.

The SINR reporting configuration associated with the CMR or IMR is ignored, or the RSRP reporting configuration associated with CMR or IMR is prioritized.

The RSRP reporting configuration associated with the CMR or IMR is ignored, or the SINR reporting configuration associated with CMR or IMR is prioritized.

In some embodiments, for aperiodic CMR or IMR, the resource sets should be associated with the same triggering state or same triggering offset.

Embodiment #4—Reporting Format for Differential SINR Reporting

In some embodiments, the SINR is defined as the signal power contribution divided by the noise and interference power contribution, where the signal power contribution is determined according to the CMR, and also the noise and interference power contribution is determined according to the following rules:

If NZP-IMR is configured for interference measurement, the noise and interference measurement is performed using NZP-IMR associated with the CMR.
  In an example, the noise and interference power contribution is determined based on signal power contribution of NZP-IMR.
  In an example, the noise and interference power contribution is determined based on receive power contribution of NZP-IMR.

If ZP-IMR is configured for interference measurement, the noise and interference measurement is performed using ZP-IMR associated with the CMR.
  In an example, the noise and interference power contribution is determined based on receive power contribution of NZP-IMR.

If ZP-IMR+NZP-IMR is configured for interference measurement, the noise and interference measurement is performed according to ZP-IMR and NZP-IMR associated with the CMR.
  In an example, the noise and interference power contribution also includes the noise and interference power of the CMR.

In some embodiments, the SINR is defined as linear average of the signal power contribution of CMR divided by sum of one of the following and linear average of signal power contribution of NZP-IMR, if any.
  Linear average of the noise and interference power contribution of CMR
  Linear average of the noise and interference power contribution of NZP-IMR, if any
  Linear average of the noise and interference power contribution or received power of ZP-IMR, if any In some embodiments, the linear average is per resource element (RE) or resource block (RB) level.

In some embodiments, in order to handle a higher or lower SINR value compared with the reporting range of SINR or emulate a strong interference from NZP-IMR, the power offset of corresponding value used for SINR determination to NZP-IMR or CMR to be measured is configurable in SINR reporting configuration.

In an example, for SINR determination, the power offset should be compensated for corresponding measurement results of NZP-IMR or CMR.

In an example, if the power offset for NZP-IMR is O1 dB and the power offset for CMR is O2 dB, when, according to measurement for the NZP-IMR+CMR case, signal power contributions for NZP-IMR and CMR are S1 and S2 in dB, respectively, noise and interference power contributions for NZP-IMR and CMR are I1 and I2 in dB, respective, we have the SINR value of $(S2+O2)-\log 10(10^{\wedge}(S1+O1)+10^{\wedge}(I1)+10^{\wedge}(I2))$ in dB In some embodiments, differential SINR reporting should be supported. Furthermore, more than one CMR or SINR is reported in such case.

In an example, one reference SINR is reported, and the other SINR values to be reported are determined with a reference to the reference SINR. For instance, the reference SINR is the largest SINR in the reporting instance.

In an example, the SINR values are reported per group, where, within one group, a reference SINR is reporting, and the other SINR values to be reported is determined with a reference to the reference SINR.
  For example, the group can be antenna group or beam group.
  For example, the reference SINR for a group can be determined with a reference to the SINR in the other group or largest SINR in the reporting instance.
  For example, the reference SINR is measured value rather than the value to be reported.

In an example, the step size for the other SINR values compared with the reference SINR is configurable or determined according to the value of reference SINR.
  For example, there is a configurable step size, which is only applicable when the reference SINR is located in the range.

In some embodiments, there are two groups to be reported in SINR reporting instance, where the group is based on the definition of antenna group, where the RSs from the same group can NOT be received simultaneously but the RSs from the different group can be received simultaneously. Besides CMR index, the SINR values corresponding to the CMR-ID are reported accordingly. Within one group, the largest SINR is reported by the absolute value, which is also called as reference SINR, and the other one is reported with a reference to the largest SINR. For example, the SINR value for $CMR-ID_y$ is (15−4)=11 dB.

TABLE 1

Examples of different SNR reporting

| | | |
|---|---|---|
| Group-1 | $CMR-ID_x$, e.g., CSI-RS#3 | Reference SINR, e.g., 15 dB |
| | $CMR-ID_y$, e.g., CSI-RS#5 | Differential SINR, e.g., −4 dB |
| Group-2 | $CMR-ID_z$, e.g., CSI-RS#1 | Reference SINR, e.g., 0 dB |
| | $CMR-ID_k$, e.g., CSI-RS#9 | Differential SINR, e.g., −3 dB |

In some embodiments, and when considering large ranges of difference between SINR values but limited bits for differential reporting, a special state of differential SINR represents at least one of following:

(1) The differential SINR value is larger than the first threshold compared with the reference SINR but not less than or larger than a second threshold of absolute SINR value.

(2) The SINR value is less than or equal to a second threshold of absolute SINR value.

In some embodiments, the above is applied when the value of reference SINR minus the first threshold is greater than or equal to the second threshold of absolute SINR value.

In an example, Table 2 shows an example of different SINR reporting mapping, where the reference SINR is the largest SINR (e.g., in the group). In this table, we have two special state as follows:

DIFFSINR_14: If reference SINR−14<−23, −14≥ΔSINR>−15; otherwise, −14≥ΔSINR and absolute SINR≥−23

DIFFSINR_15: If reference SINR−14<−23, −15≥ΔSINR; otherwise, absolute SINR<−23

Herein, the −23 dB is the identified smallest value for absolute SINR reporting, which means the lowest SINR requirement for data transmission in general. When the DIFFSINR_14 is reported, that means that if one SINR value is less than range of differential SINR but not the threshold for absolute SINR.

TABLE 2

Different SINR reporting mapping

| Reported code in SINR reporting instance | Measured quantity value (difference in measured SINR from reference SINR) | Unit |
| --- | --- | --- |
| DIFFSINR_0 | 0 ≥ ΔSINR > −1 | dB |
| DIFFSINR_1 | −1 ≥ ΔSINR > −2 | dB |
| DIFFSINR_2 | −2 ≥ ΔSINR > −3 | dB |
| DIFFSINR_3 | −3 ≥ ΔSINR > −4 | dB |
| DIFFSINR_4 | −4 ≥ ΔSINR > −5 | dB |
| DIFFSINR_5 | −5 ≥ ΔSINR > −6 | dB |
| DIFFSINR_6 | −6 ≥ ΔSINR > −7 | dB |
| DIFFSINR_7 | −7 ≥ ΔSINR > −8 | dB |
| DIFFSINR_8 | −8 ≥ ΔSINR > −9 | dB |
| DIFFSINR_9 | −9 ≥ ΔSINR > −10 | dB |
| DIFFSINR_10 | −10 ≥ ΔSINR > −11 | dB |
| DIFFSINR_11 | −11 ≥ ΔSINR > −12 | dB |
| DIFFSINR_12 | −12 ≥ ΔSINR > −13 | dB |
| DIFFSINR_13 | −13 ≥ ΔSINR > −14 | dB |
| DIFFSINR_14 | If reference SINR −14 < −23, −14 ≥ ΔSINR > −15; Else, −14 ≥ ΔSINR and absolute SINR ≥−23 | dB |
| DIFFSINR_15 | If reference SINR −14 < −23, −15 ≥ ΔSINR; Else, absolute SINR < −23 | dB |

Embodiment #5—UE Capabilities for SINR Reporting

In some embodiments, different UEs may have different requirement for the SINR reporting, and the UE reporting capability can be used to provide the information of the UE's own capability, which is used for gNB to determine whether or how to configure the SINR reporting.

In some embodiments, supporting of NZP, ZP IMR, NZP+ZP IMR for SINR reporting are separate UE capabilities.

ZP-IMR is mandatorily supported if SINR reporting is supported

NZP-IMR is mandatorily supported if SINR reporting is supported

In some embodiments, and regarding the association between CMR and NZP/ZP-IMR, at least one of the following UE capability should be supported:

For the association between one CMR and up to L1 NZP/ZP-IMR resources, L1 is up to UE capability.

For the association between one NZP/ZP-IMR and up to L2 CMR resources, L2 is up to UE capability.

In some embodiments, when NZP-IMR+ZP-IMR are both used for SINR reporting or interference measurement, at least one of following capabilities should be supported:

Maximum number of NZP-IMR

Maximum number of ZP-IMR with repetition='on'

Maximum total number of NZP-IMR and ZP-IMR in SINR reporting

In some embodiments, when NZP-IMR is used for SINR reporting or interference measurement, at least one of the following capabilities should be supported:

Support of repetition RRC parameter for NZP-IMR, or maximum number of NZP-IMR

Support of repetition RRC parameter being 'on' for NZP-IMR, or maximum number of NZP-IMR with repetition RRC parameter being 'on'

Support of repetition RRC parameter being 'off' for NZP-IMR, or maximum number of NZP-IMR with repetition RRC parameter being 'off'

In some embodiments, and for SINR reporting, at least one of the following capabilities should be supported:

The beam reporting time capability parameter, which is up to the subcarrier spacing The beam reporting time capability parameter to be reported by UE can be used for both SINR based reporting and RSRP-based reporting.

For example, the aperiodic CMR is indicated for the PDSCH and PDCCH, which can efficiently save the overhead of UE reporting and prevent the ambiguity of deriving CPA for the PDSCH or PDCCH transmission Embodiment #6—DL Tx Beam Sweeping for SINR Reporting In some embodiments, the DL Tx beam sweeping for SINR reporting is described in detail, where the UE and gNB behavior in three cases of CMR+NZP-IMR, CMR+ZP-IMR and CMR+NZP-IMR+ZP-IMR are taken into account.

Figure 5:
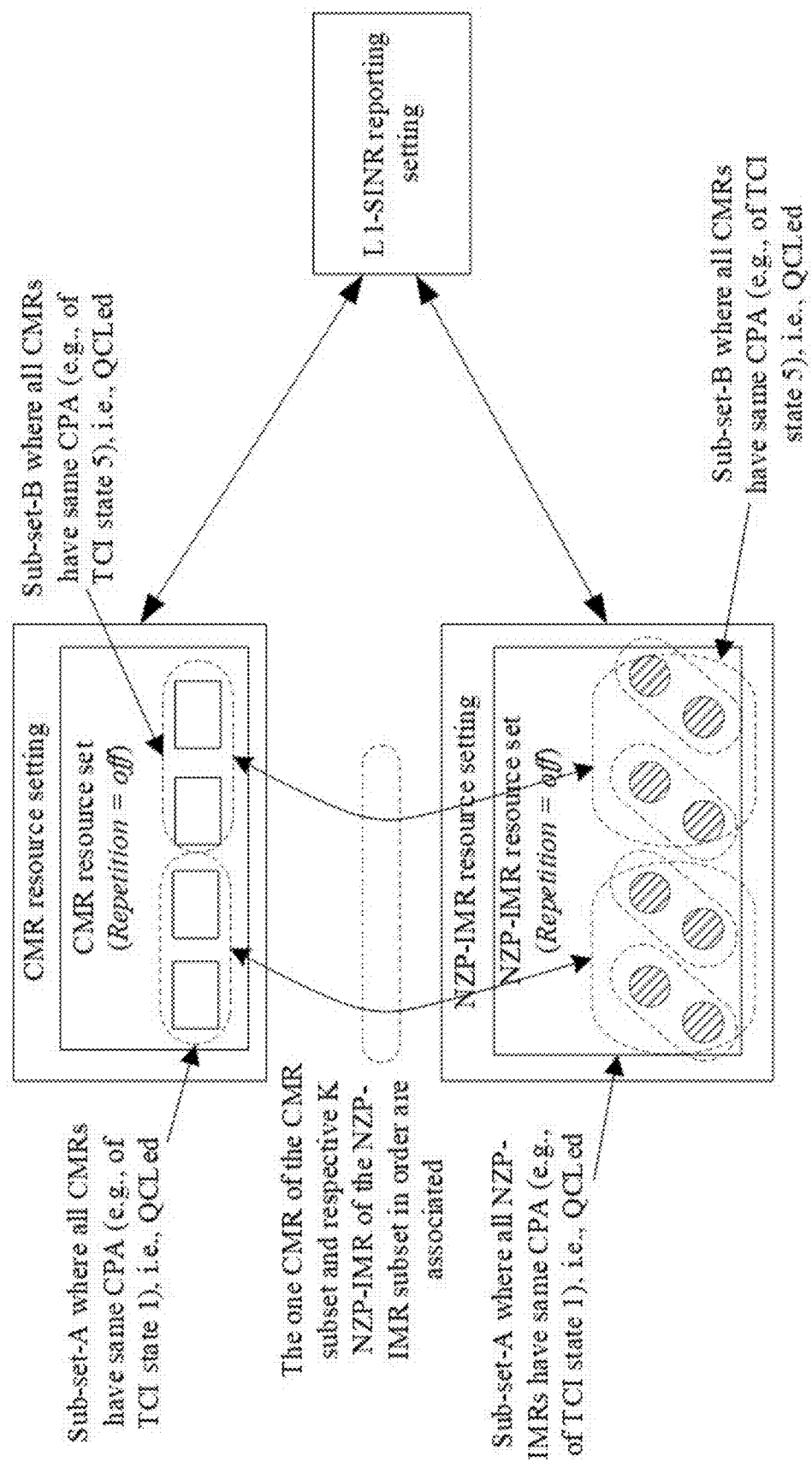
FIG. 5 shows an example of SINR reporting with a channel measurement resource (CMR) and a non-zero power interference measurement resource (NZP-IMR) for downlink (DL) transmission (Tx) beam sweeping.

In some embodiments, and regarding CMR+NZP-IMR, the configuration and association framework for DL Tx beam sweeping is shown in FIG. 5. The CPA parameter, e.g., QCL parameter, of CMR and NZP-IMR are separately configured per resource, and the set of CMR(s) and NZP-IMR(s) are both configured with Repetition='off' in a SINR reporting configuration.

In an example, the resources in CMR set are transmitted with different DL Tx spatial domain filter, e.g., DL beam sweeping, and similarly the resources in IMR set are transmitted with different DL TX spatial domain filter. In an example, the resources in the CMR set are precluded from being transmitted with the same DL Tx spatial domain filter, e.g., DL beam sweeping, and similarly the resources in IMR set are precluded from being transmitted with the same DL TX spatial domain filter.

Then, the association or combination between CMR and NZP-IMR is performed according to the following rules:

Step 1. The subset of CMR(s) and subset of NZP-IMR(s) are associated if CMR(s) of the subset and NZP-IMR(s) of the subset have the same CPA.

Step 2. For the subset of CMR(s) and its associated subset of NZP-IMR(s), the one CMR of the CMR subset and respective K NZP-IMR of the NZP-IMR subset in order are associated.

According to SINR measurement, the L CRI (s) and the SINR value corresponding to each of CRI(s) are reported in a reporting instance.

Figure 6:
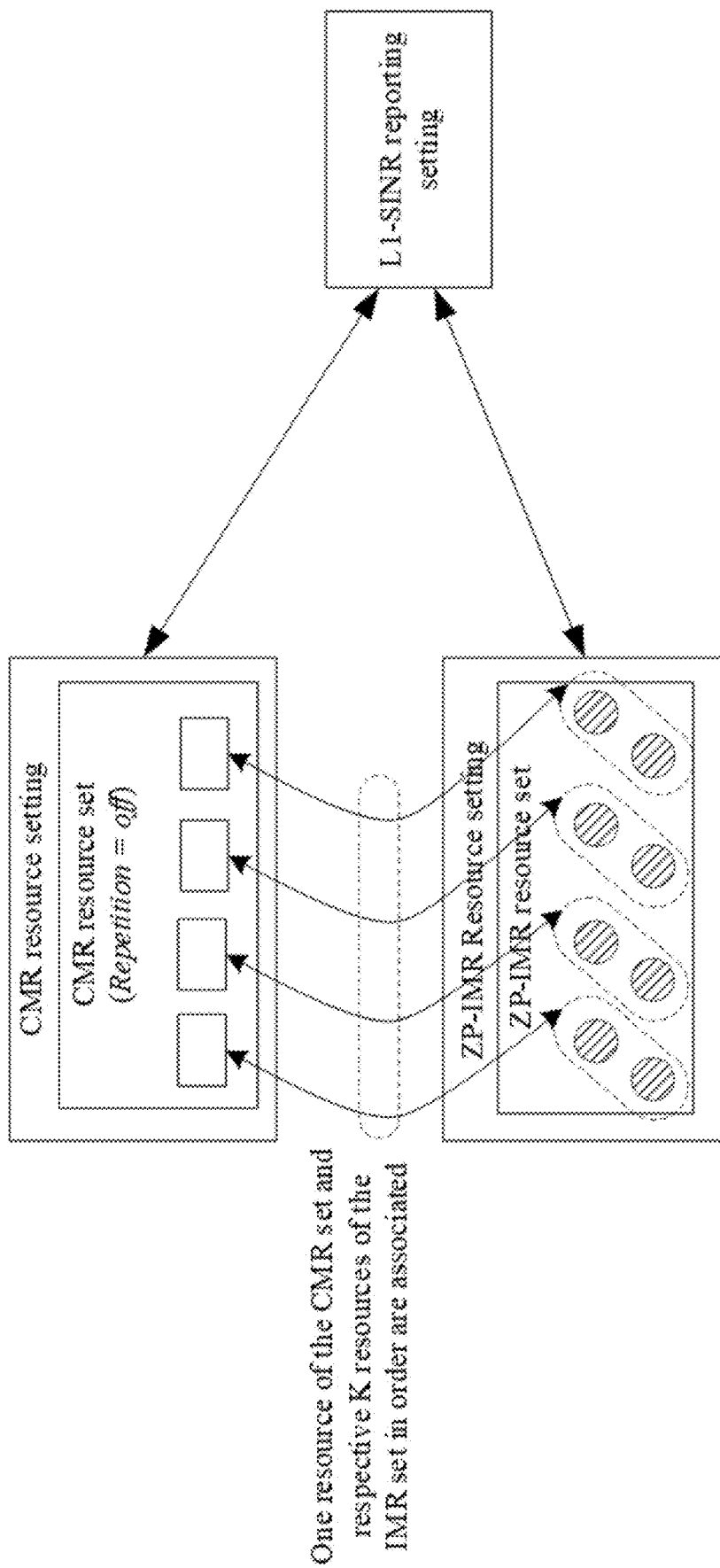
FIG. 6 shows an example of SINR reporting with a CMR and a zero power IMR (ZP-IMR) for DL Tx beam sweeping.

In some embodiments, and regarding CMR+ZP-IMR, the configuration and association framework for DL Tx beam sweeping is shown in FIG. 6. The CPA parameter for CMR is configured per resource, but the CPA parameter for ZP-IMR is determined according to the associated CMR, rather than explicitly configuration.

In an example, there are a set of N CMR(s) and a set of M IMR(s) resources which are configured in the SINR reporting configuration, where M=NK and N, K and M are positive integers. One resource of the CMR set and respective K resources of the IMR set in order are associated.

Meanwhile, the CMR only is configured with Repetition='off'. According to SINR measurement, the L CRI (s) and the SINR value corresponding to each of CRI(s) are reported in a reporting instance.

Figure 7:
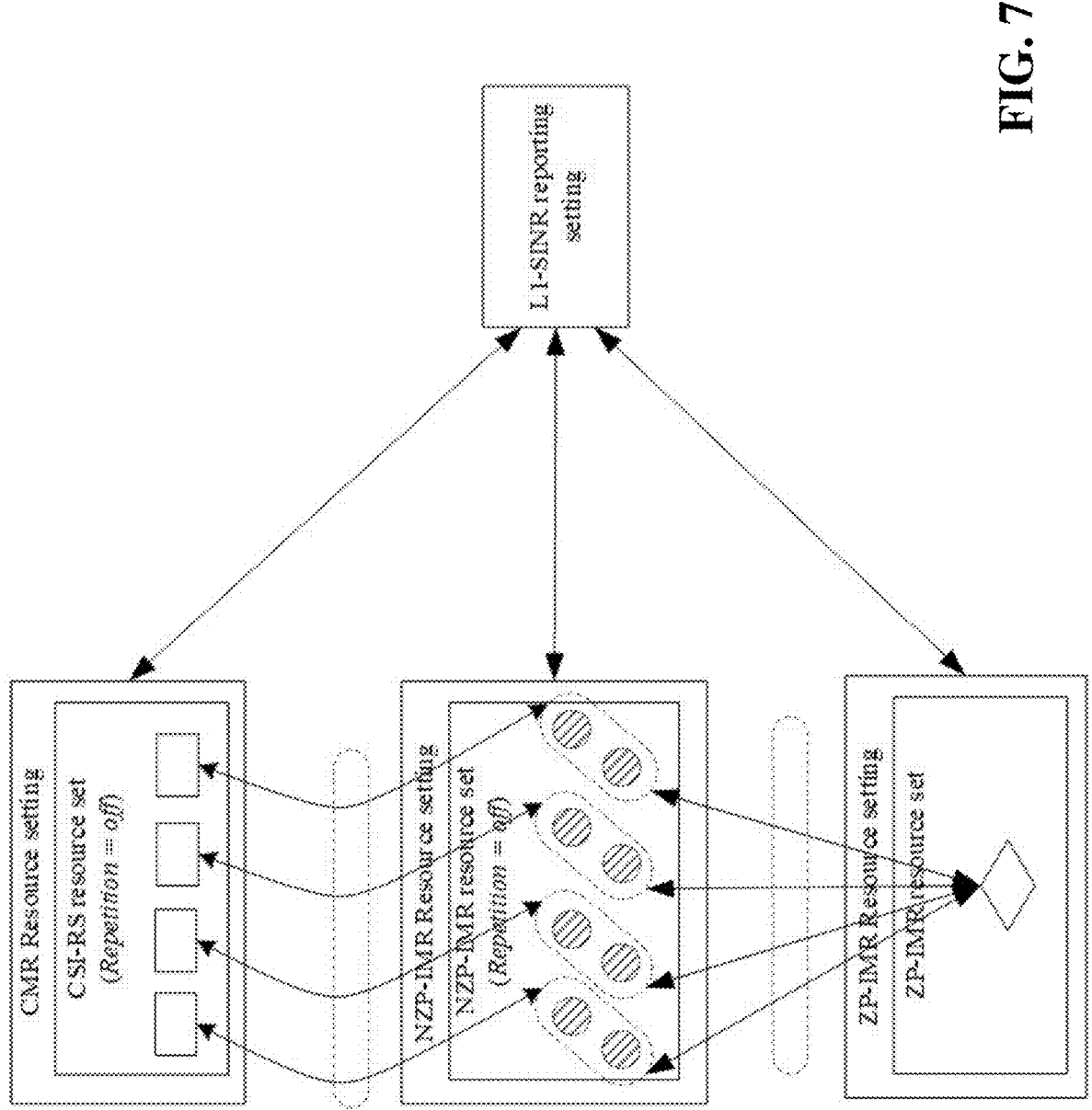
FIG. 7 shows an example of SINR reporting with a CMR, NZP-IMR and ZP-IMR for DL Tx beam sweeping.

In some embodiments, and regarding CMR+NZP-IMR+ZP-IMR, the configuration and association framework for DL Tx beam sweeping is shown in FIG. 7, where only one ZP-IMR is configured for saving overhead and UE complexity. Similarly, the CPA parameters for CMR and NZP-IMR are separately configured per resource, but the CPA of ZP-IMR is determined according to the associated CMR.

In an example, ZP-IMR is associated with all CMR, but NZP-IMR is associated with CMR is according to the following rule:
One resource of the CMR set and respective K resources of the NZP-IMR set are associated in a specific order.

Also, CMR resource set and NZP-IMR resource set are both configured with repetition="off", where UE assumes that a resource in CMR resource set and a resource in IMR resource set are not transmitted with the same spatial domain filter in order to guarantee that UE shall use the same Rx beam for any of CMR(s) and IMR(s) in SINR reporting configuration.

According to SINR measurement, the L CRI (s) and the SINR value corresponding to each of CRI(s) are reported in a reporting instance.

Embodiment #7—DL Rx Beam Sweeping for SINR Reporting

In some embodiments, the DL Rx beam sweeping for SINR reporting is described in detail, where the UE and gNB behaviors in three cases of CMR+NZP-IMR, CMR+ZP-IMR and CMR+NZP-IMR+ZP-IMR are taken into account. In an example, the DL Rx beam sweeping is achieved through the RRC parameter repetition='on', which means that the same Tx beam is repeated across multiple DL RS resources.

Figure 8:
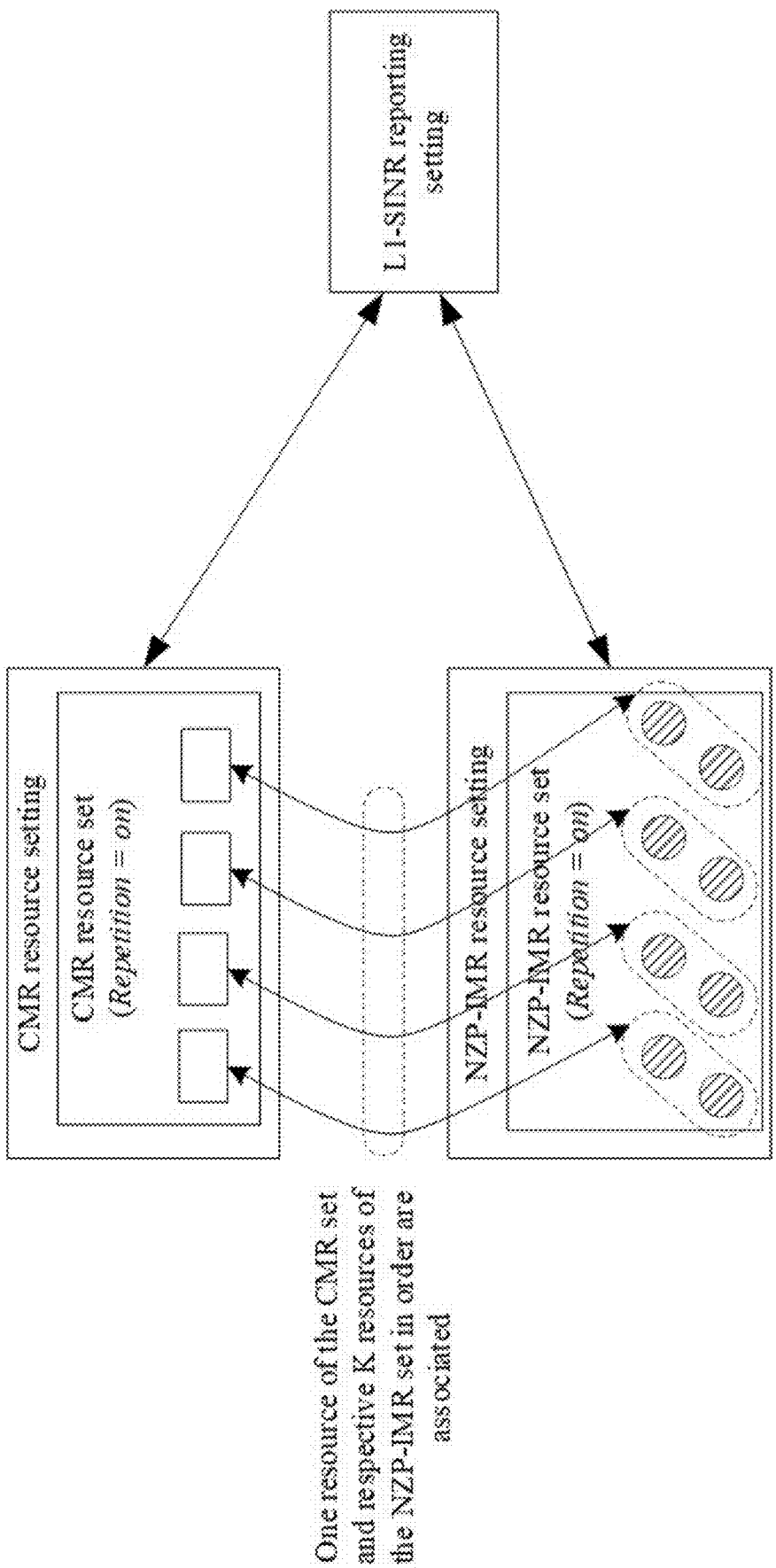
FIG. 8 shows an example of SINR reporting with a CMR and a NZP-IMR for DL reception (Rx) beam sweeping.

In some embodiments, and regarding CMR+NZP-IMR, the configuration and association framework for DL Rx beam sweeping is shown in FIG. 8. The resource set of CMR and resource set of NZP-IMR are both configured with repetition='on' in the SINR reporting configuration.

In an example, the CPA(s) for all CMRs in the set should be the same, and the CPA(s) for all NZP-IMR(s) in the set should be the same.

In an example, the CPA(s) for all CMRs and all NZP-IMR should be the same.

In an example, the CMR(s) in the set and IMR(s) in the set are transmitted with the same spatial domain filter.

In some embodiments, the CMR(s) in the set and NZP-IMR(s) in the set are transmitted in different OFDM symbols.

In an example, the CMR(s) is not associated with the NZP-IMR(s).

In some embodiments, there is a set of N CMR(s) and a set of M NZP-IMR(s) resources which are configured in the SINR reporting configuration, where M=NK and N, K and M are positive integers. One resource of the CMR set and respective K resources of the NZP-IMR set in order are associated. After SINR measurement, the SINR value(s) without CMR index(es) is reported to the gNB side.

Figure 9:
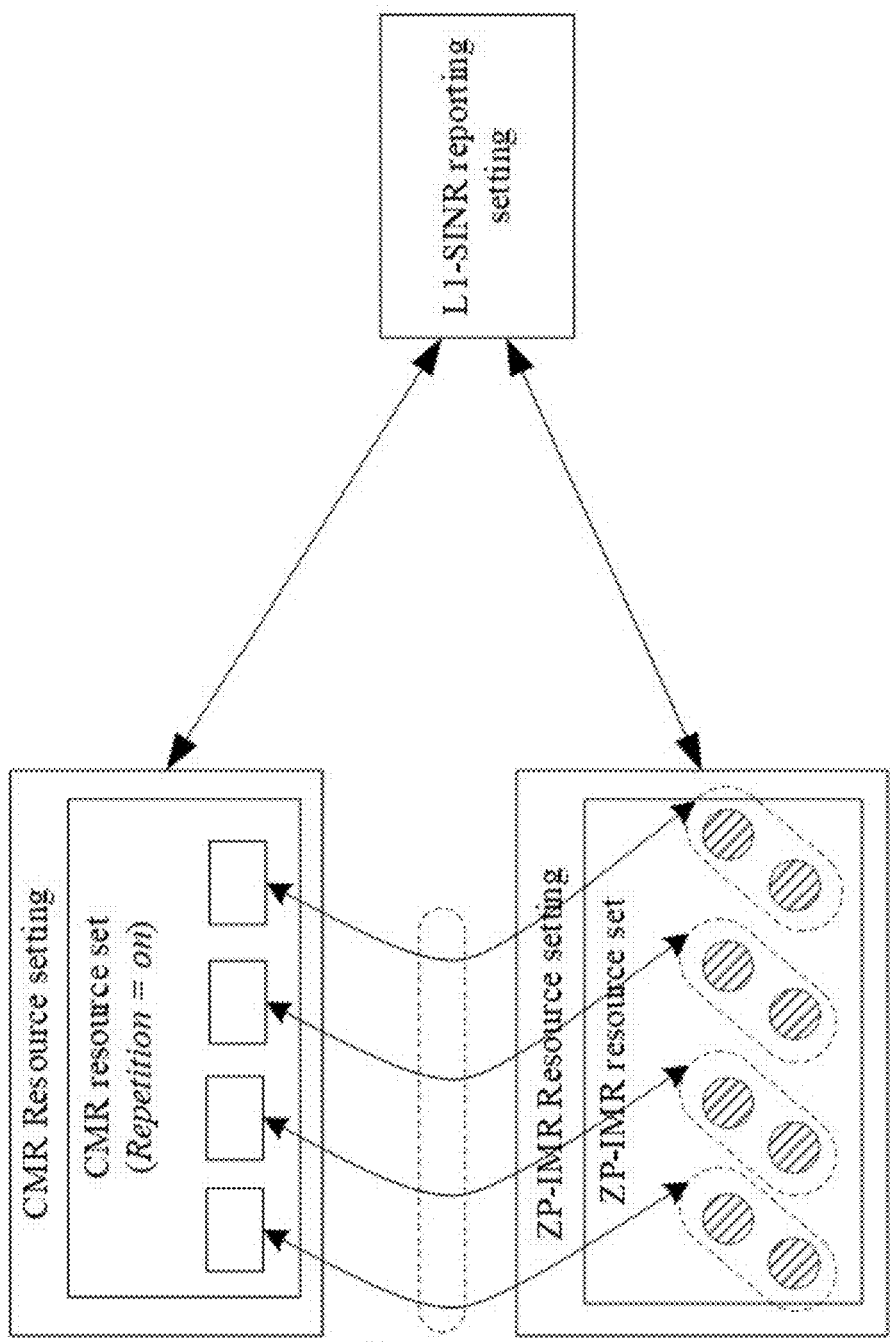
FIG. 9 shows an example of SINR reporting with a CMR and a ZP-IMR for DL reception (Rx) beam sweeping.

In some embodiments, and regarding CMR+ZP-IMR, the configuration and association framework for DL Rx beam sweeping is shown in FIG. 9. The CPA parameter for CMR is separately configured per resource, and also the CPA of ZP-IMR is determined according to the associated CMR. The CMR set only, rather than both CMR and ZP-IMR sets, is configured with repetition='on'.

In some embodiments, the association between CMR and ZP-IMR is configured per resource group. Furthermore, one CMR is associated with a ZP-IMR group, which is grouped according to the bitmap solution, which means that ZP-IMR(s) associated with bit of "1" in the bitmap are grouped as a ZP-IMR group. After SINR measurement, the SINR value(s) without CMR index(es) is reported to the gNB side.

Considering that the Rx beam can NOT be changed in a single ZP-IMR, the DL Rx beam sweeping is not supported when only a single ZP-IMR can be used for the case of CMR+NZP-IMR+ZP-IMR. Consequently, in order to enable Rx beam sweeping and considering overhead, only one ZP-IMR is configured if the RRC parameter repetition for CMR or NZP-IMR is configured with value of "off"; but multiple ZP-IMRs are configured if the repetition RRC parameter for CMR or NZP-IMR is configured to be "on".

Figure 10:
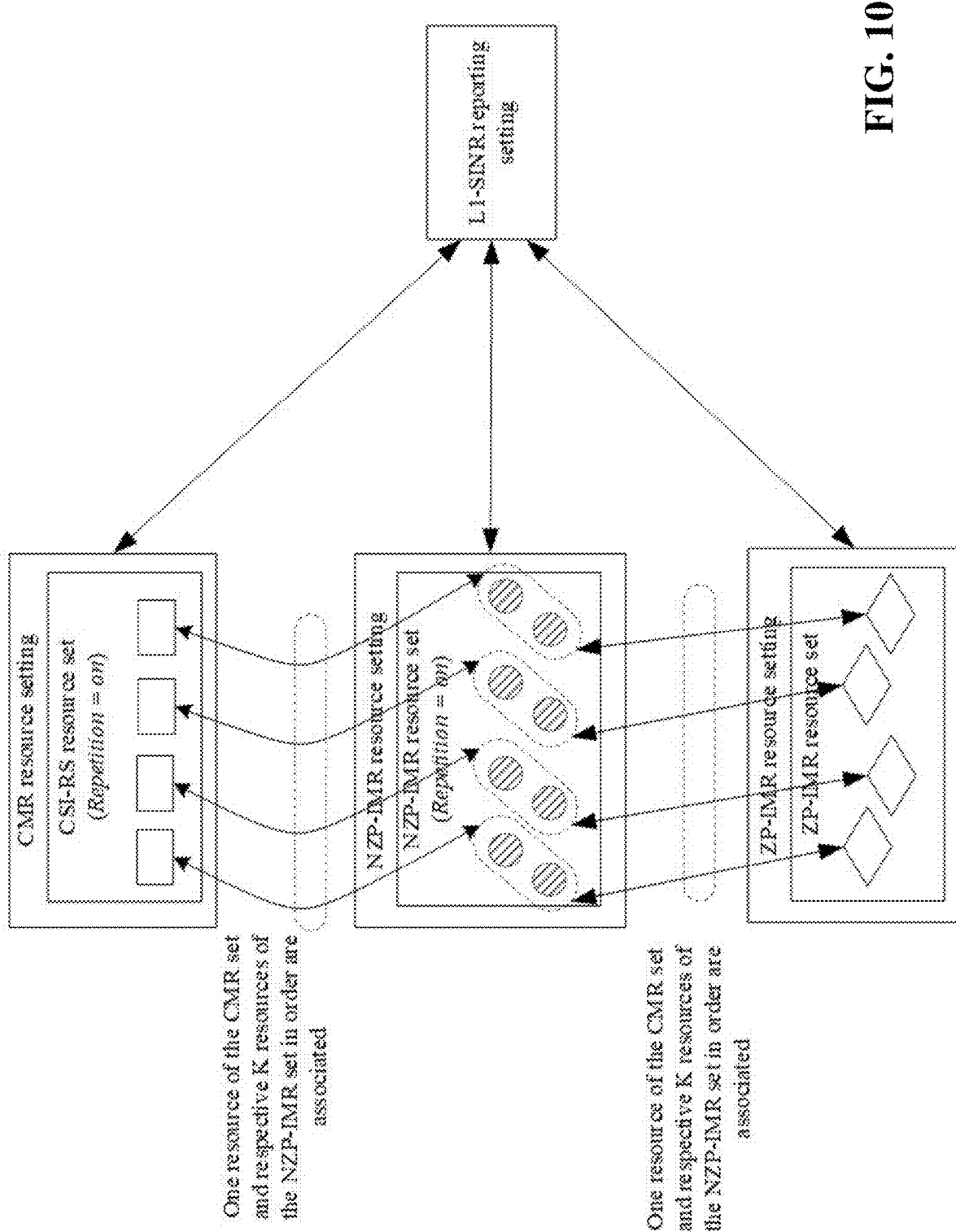
FIG. 10 shows an example of SINR reporting with a CMR, NZP-IMR and ZP-IMR for DL Rx beam sweeping.

In some embodiments, and regarding CMR+NZP-IMR+ZP-IMR, the configuration and association framework for DL Rx beam sweeping is shown in FIG. 10. In SINR reporting configuration, CMRs in the set have the same CPA, and meanwhile NZP-IMRs in the set have the same CPA. Furthermore, all of CMR(s) and NZP-IMR(s) have the same CPA. Similarly, the CPA of ZP-IMR is derived according to the corresponding CMR or NZP-IMR.

In an example, CMR and NZP-IMR are both configured with repetition='on'

In an example, a resource in CMR set and a resource in IMR set, including NZP and ZP IMR are transmitted in different OFDM symbols. For example, the resource in CMR set is not associated with the resource in IMR set.

In an example, the association between CMR and ZP/NZP-IMR resources is performed according to the rule that one resource of the CMR set and respective K resources of the ZP/NZP-IMR set in order are associated
For example, the multiple CMR(s) or multiple NZP-IMR(s) associated with a ZP-IMR should have the same CPA.
For example, the number of ZP-IMR is determined according to the number of (different) CPAs of resources in the CMR set. Specifically, the number of ZP-IMR is the equal to the number of (different) CPAs of resource in the CMR set.

In some embodiments, after SINR measurement according to the CMR, ZP-IMR and NZP-IMR in SINR reporting configuration, the SINR value(s) without CMR index(es) is reported to the gNB side.

Exemplary Methods for the Disclosed Technology

Figure 11A:
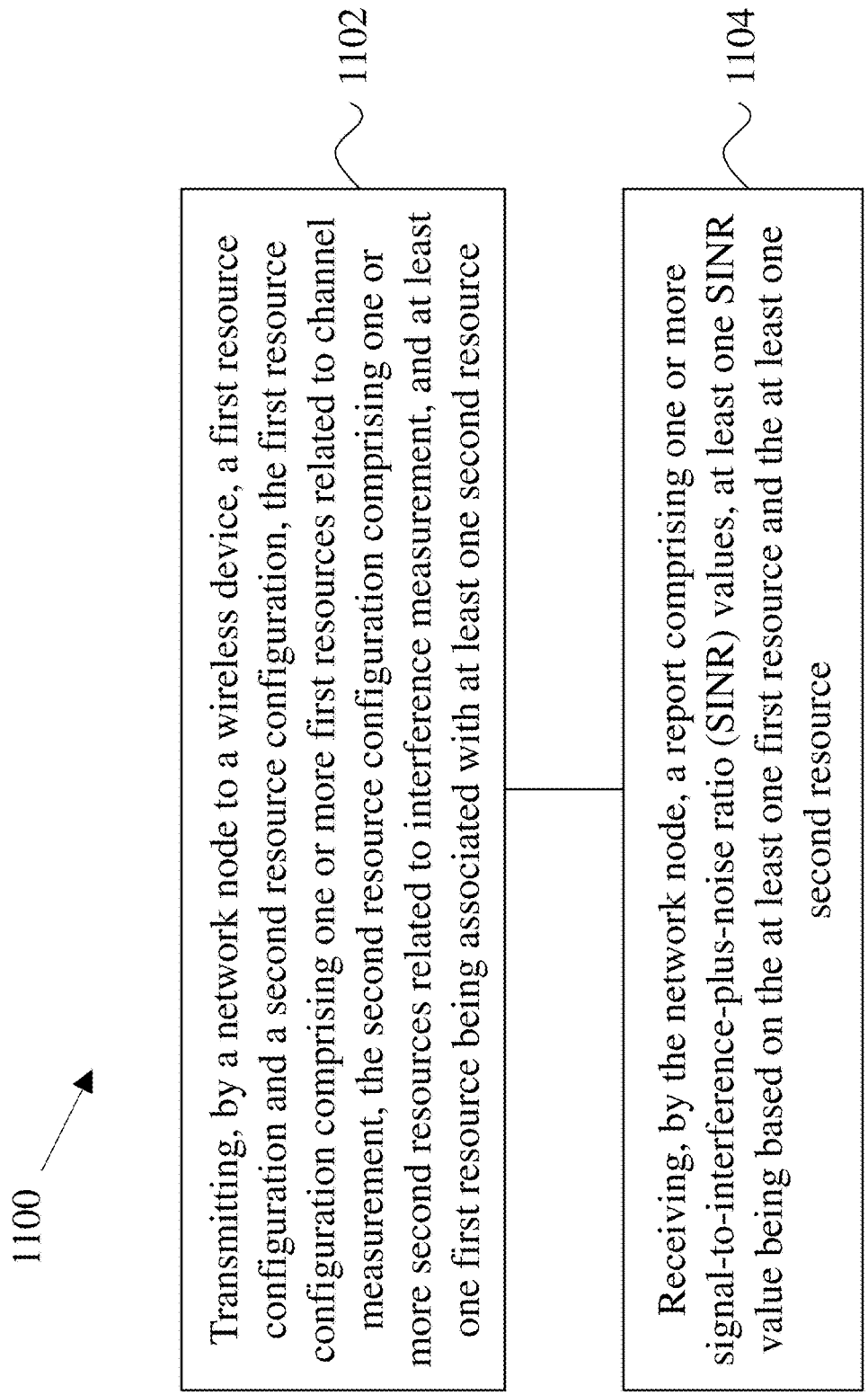

FIG. 11A shows an example of a wireless communication method 1100 for resource management for reporting SINR in mobile communication technology. The method 1100 includes, at step 1102, transmitting, by a network node to a wireless device, a first resource configuration and a second resource configuration, the first resource configuration comprising one or more first resources related to channel measurement, the second resource configuration comprising one or more second resources related to interference measurement, and at least one first resource being associated with at least one second resource.

The method 1100 includes, at step 1104, receiving, by the network node, a report comprising one or more signal-to-interference-plus-noise ratio (SINR) values, at least one SINR value being based on the at least one first resource and the at least one second resource.

FIG. 11B shows an example of a wireless communication method 1150 for resource management for reporting SINR in mobile communication technology. The method 1150 includes, at step 1152, receiving, by a wireless device from a network node, a first resource configuration and a second resource configuration, the first resource configuration comprising one or more first resources related to channel measurement, the second resource configuration comprising one or more second resources related to interference measurement, and at least one first resource being associated with at least one second resource.

The method 1150 includes, at step 1154, transmitting, by the network device to the network node, a report comprising one or more signal-to-interference-plus-noise ratio (SINR) values, at least one SINR value being based on measurement results of the at least one first resource and the at least one second resource.

In some embodiments, and in the context of methods 1100 and 1150, the first resource includes a channel measurement resource (CMR), and the second and third resources include an interference measurement resource (IMR). In an example, an IMR include a zero-power IMR (ZP-IMR) and/or a non-zero-power IMR (NZP-IMR).

Implementations for the Disclosed Technology

Figure 12:
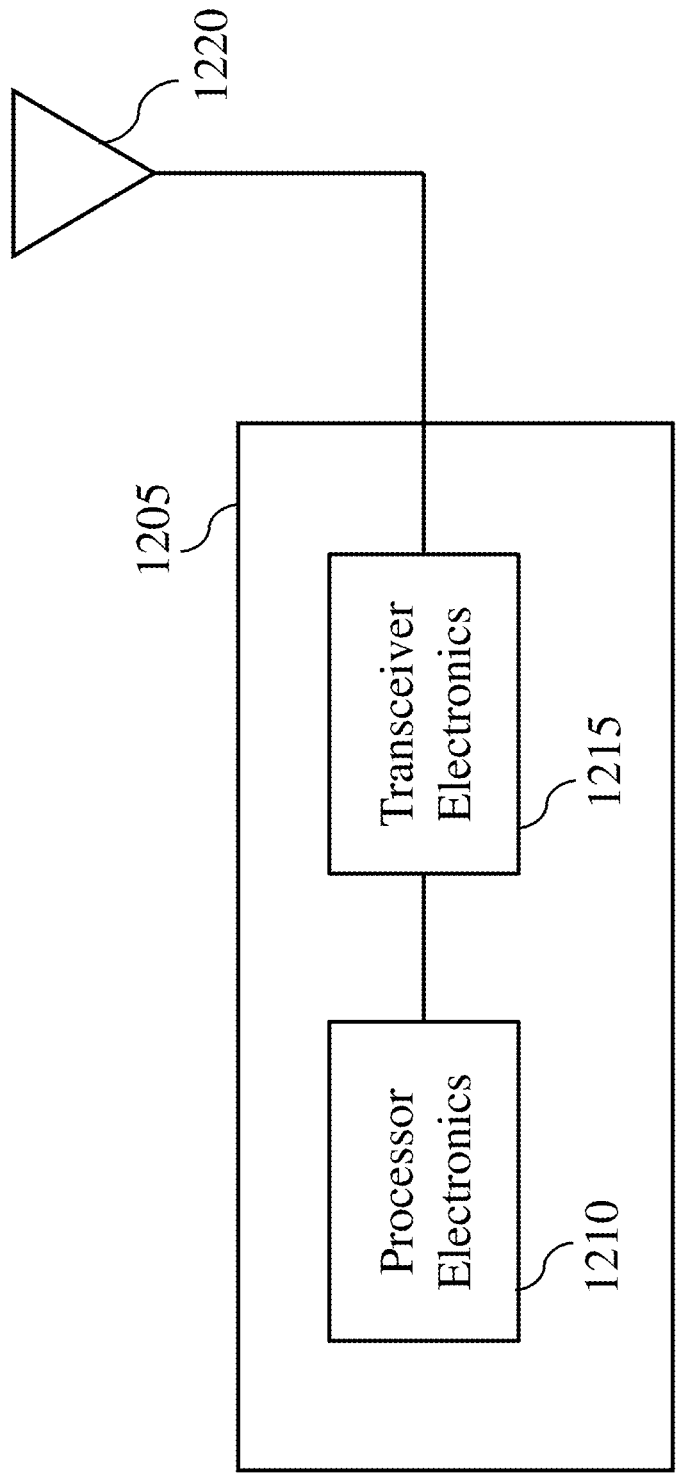
FIG. 12 is a block diagram representation of a portion of an apparatus, in accordance with some embodiments of the presently disclosed technology.

FIG. 12 is a block diagram representation of a portion of an apparatus, in accordance with some embodiments of the presently disclosed technology. An apparatus 1205, such as a base station or a wireless device (or UE), can include processor electronics 1210 such as a microprocessor that implements one or more of the techniques presented in this document. The apparatus 1205 can include transceiver electronics 1215 to send and/or receive wireless signals over one or more communication interfaces such as antenna(s) 1220. The apparatus 1205 can include other communication interfaces for transmitting and receiving data. Apparatus 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the apparatus 1205.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
receiving, by a wireless device from a network node, a first resource configuration and a second resource configuration, wherein the first resource configuration comprises one or more first resources related to channel measurement, wherein the second resource configuration comprises one or more second resources related to interference measurement, and wherein at least one first resource is associated with at least one second resource; and
transmitting, by the wireless device to the network node, a report comprising a plurality of signal-to-interference-plus-noise ratio (SINR) values,
wherein at least one of the plurality of SINR values is based on measurement results of the at least one first resource and the at least one second resource, wherein the at least one of the plurality of SINR values is a linear average of a power contribution of the at least one first resource divided by a linear average of a received power contribution of the at least one second resource,
wherein a reported SINR value of the plurality of SINR values is relative to a reference SINR value, and wherein a reported code of the reported SINR value is determined based on a SINR mapping between the reported SINR value and a codepoint in a SINR reporting field.

2. The method of claim 1, wherein a SINR value is based on a most recent second resource and a most recent first resource.

3. The method of claim 1, wherein the one or more first resources and the one or more second resources have a same channel property assumption (CPA).

4. The method of claim 1, wherein the one or more first resources comprise a set of N first resources, wherein the one or more second resources comprise a set of M second resources, wherein M=N×K, and wherein M, N and K are positive integers.

5. The method of claim 4, wherein one of the set of N first resources is associated with an ordered set of K second resources.

6. The method of claim 1, wherein one of the one or more second resources comprises a non-zero-power (NZP) second resource or a zero-power (ZP) second resource, and wherein the at least one of the plurality of SINR values is based on: a received power contribution of the NZP second resource, or a received power contribution of the ZP second resource.

7. The method of claim 1, wherein the reference SINR value is a largest SINR value of the plurality of SINR values or a measured SINR value.

8. The method of claim 1, wherein the at least one first resource comprises one or more of a synchronization signal block (SSB), a channel state information (CSI)-reference signal (RS) resource, a non-zero-power CSI-RS (NZP-CSI-RS) resource, or a NZP-CSI-RS resource for channel measurement.

9. The method of claim 1, wherein the at least one second resource comprises a non-zero-power (NZP) second resource that is equivalent to a NZP channel state information (CSI)-reference signal (RS) resource for interference measurement, or a zero-power (ZP) second resource that is equivalent to a CSI interference measurement (CSI-IM) resource.

10. A method of wireless communication, comprising:
transmitting, by a network node to a wireless device, a first resource configuration and a second resource configuration, wherein the first resource configuration comprises one or more first resources related to channel measurement, wherein the second resource configuration comprises one or more second resources related to interference measurement, and wherein at least one first resource is associated with at least one second resource; and
receiving, by the network node, a report comprising a plurality of signal-to-interference-plus-noise ratio (SINR) values,
wherein at least one of the plurality of SINR values is based on measurement results of the at least one first resource and the at least one second resource, wherein the at least one of the plurality of SINR values is a linear average of a power contribution of the at least one first resource divided by a linear average of a received power contribution of the at least one second resource,
wherein a reported SINR value of the plurality of SINR values is relative to a reference SINR value, and wherein a reported code of the reported SINR value is determined based on a SINR mapping between the reported SINR value and a codepoint in a SINR reporting field.

11. The method of claim 10, wherein a SINR value is based on a most recent second resource and a most recent first resource.

12. The method of claim 10, wherein the one or more first resources and the one or more second resources have a same channel property assumption (CPA).

13. The method of claim 10, wherein the one or more first resources comprise a set of N first resources, wherein the one or more second resources comprise a set of M second resources, wherein M=N×K, and wherein M, N and K are positive integers.

14. The method of claim 13, wherein one of the set of N first resources is associated with an ordered set of K second resources.

15. The method of claim 10, wherein one of the one or more second resources comprises a non-zero-power (NZP) second resource or a zero-power (ZP) second resource, and wherein the at least one of the plurality of SINR values is based on: a received power contribution of the NZP second resource, or a received power contribution of the ZP second resource.

16. The method of claim 10, wherein the reference SINR value is a largest SINR value of the plurality of SINR values or a measured SINR value.

17. The method of claim 10, wherein:
(1) at least the first resource comprises one or more of a synchronization signal block (SSB), a channel state information (CSI)-reference signal (RS) resource, a non-zero-power CSI-RS (NZP-CSI-RS) resource, or a NZP-CSI-RS resource for channel measurement; or
(2) at least the second resource comprises a non-zero-power (NZP) second resource that is equivalent to a NZP channel state information (CSI)-reference signal (RS) resource for interference measurement, or a zero-power (ZP) second resource that is equivalent to a CSI interference measurement (CSI-IM) resource.

18. An apparatus for wireless communication comprising a processor and a memory storing instructions, which upon execution by the processor, causes the apparatus to perform operations including:

receiving, from a network node, a first resource configuration and a second resource configuration, wherein the first resource configuration comprises one or more first resources related to channel measurement, wherein the second resource configuration comprises one or more second resources related to interference measurement, and wherein at least one first resource is associated with at least one second resource; and transmitting, to the network node, a report comprising a plurality of signal-to-interference-plus-noise ratio (SINR) values, wherein at least one of the plurality of SINR values is based on measurement results of the at least one first resource and the at least one second resource, wherein the at least one of the plurality of SINR values is a linear average of a power contribution of the at least one first resource divided by a linear average of a received power contribution of the at least one second resource, wherein a reported SINR value of the plurality of SINR values is relative to a reference SINR value, and wherein a reported code of the reported SINR value is determined based on a SINR mapping between the reported SINR value and a codepoint in a SINR reporting field.

19. An apparatus for wireless communication comprising a processor configured to perform operations including:

transmitting, to a wireless device, a first resource configuration and a second resource configuration, wherein the first resource configuration comprises one or more first resources related to channel measurement, wherein the second resource configuration comprises one or more second resources related to interference measurement, and wherein at least one first resource is associated with at least one second resource; and receiving a report comprising a plurality of signal-to-interference-plus-noise ratio (SINR) values, wherein at least one of the plurality of SINR values is based on the at least one first resource and the at least one second resource, wherein the at least one of the plurality of SINR values is a linear average of a power contribution of the at least one first resource divided by a linear average of a received power contribution of the at least one second resource, wherein a reported SINR value of the plurality of SINR values is relative to a reference SINR value, and wherein a reported code of the reported SINR value is determined based on a SINR mapping between the reported SINR value and a codepoint in a SINR reporting field.

* * * * *